(12) United States Patent
Zhang

(10) Patent No.: US 10,832,675 B2
(45) Date of Patent: Nov. 10, 2020

(54) SPEECH RECOGNITION SYSTEM WITH INTERACTIVE SPELLING FUNCTION

(71) Applicant: Denso International America, Inc., Southfield, MI (US)

(72) Inventor: Yu Zhang, Farmington Hills, MI (US)

(73) Assignee: Denso International America, Inc., Southfield, MI (US)

( * ) Notice: Subject to any disclaimer, the term of this patent is extended or adjusted under 35 U.S.C. 154(b) by 166 days.

(21) Appl. No.: 16/111,535

(22) Filed: Aug. 24, 2018

(65) Prior Publication Data

US 2020/0066265 A1    Feb. 27, 2020

(51) Int. Cl.
*G10L 15/22* (2006.01)
*G10L 15/065* (2013.01)

(52) U.S. Cl.
CPC ............ *G10L 15/22* (2013.01); *G10L 15/065* (2013.01); *G10L 2015/221* (2013.01); *G10L 2015/223* (2013.01)

(58) Field of Classification Search
CPC ....... G10L 15/22; G10L 15/26; G10L 15/256; G10L 2015/086; G10L 2015/221
USPC ................ 704/235, 251, 252, 270, 275, 254
See application file for complete search history.

(56) References Cited

U.S. PATENT DOCUMENTS

| | | | |
|---|---|---|---|
| 5,909,667 A | 6/1999 | Leontiades et al. | |
| 5,995,928 A | 11/1999 | Nguyen et al. | |
| 6,304,844 B1 * | 10/2001 | Pan | G10L 15/02 704/231 |
| 6,321,196 B1 | 11/2001 | Franceschi | |
| 6,601,027 B1 | 7/2003 | Wright et al. | |
| 6,725,197 B1 | 4/2004 | Wuppermann et al. | |
| 6,839,669 B1 | 1/2005 | Gould et al. | |
| 6,968,311 B2 * | 11/2005 | Knockeart | G06F 3/023 704/275 |
| 7,006,971 B1 | 2/2006 | Stahl et al. | |

(Continued)

FOREIGN PATENT DOCUMENTS

WO    WO20010124161 A1    4/2001

OTHER PUBLICATIONS

Schramm et al., "Strategies for name recognition in automatic directory assistance systems," Speech Communication, vol. 31, Issue 4, pp. 329-338 (2000).

(Continued)

*Primary Examiner* — Martin Lerner
(74) *Attorney, Agent, or Firm* — Christopher G. Darrow; Darrow Mustafa PC

(57) ABSTRACT

An interactive speech recognition system is provided for interactively interpreting a spoken phrase. The speech recognition system includes a phrase interpretation module which attempts to accurately interpret a spoken phrase by interpreting each individual term of the spoken phrase. A term interpretation module attempts to accurately interpret each individual term of the spoken phrase not accurately interpreted by the phrase interpretation module, by using a spoken spelling of the term provided by a user. An interactive spelling module attempts to interactively spell at least a portion of an individual term of the spoken phrase not accurately interpreted by the term interpretation module, by enabling a user to interactively select at least one individual character of the term of the spoken phrase from a plurality of characters.

16 Claims, 13 Drawing Sheets

(56) References Cited

U.S. PATENT DOCUMENTS

| | | | |
|---|---|---|---|
| 7,085,716 B1* | 8/2006 | Even | G10L 15/22 704/235 |
| 7,574,356 B2* | 8/2009 | Parthasarathy | G10L 15/22 704/270 |
| 7,941,316 B2 | 5/2011 | Mahajan et al. | |
| 7,949,528 B2* | 5/2011 | Parthasarathy | G10L 15/197 704/257 |
| 7,983,912 B2 | 7/2011 | Hirakawa et al. | |
| 8,255,216 B2* | 8/2012 | White | G10L 15/08 704/236 |
| 8,457,946 B2 | 6/2013 | Kuo et al. | |
| 9,236,045 B2 | 1/2016 | Labsky et al. | |
| 9,971,758 B1* | 5/2018 | Cherepanov | G10L 15/22 |
| 2006/0173680 A1 | 8/2006 | Verhasselt et al. | |
| 2006/0293889 A1 | 12/2006 | Kiss et al. | |
| 2008/0243514 A1* | 10/2008 | Gopinath | G10L 15/22 704/270 |
| 2010/0179805 A1* | 7/2010 | Huerta | G10L 15/22 704/275 |
| 2012/0310643 A1* | 12/2012 | Labsky | G10L 13/00 704/235 |
| 2014/0249816 A1* | 9/2014 | Pickering | G10L 15/08 704/236 |
| 2014/0337370 A1* | 11/2014 | Aravamudan | G10L 15/22 707/759 |
| 2017/0011024 A1* | 1/2017 | Cannings | G06F 40/30 |
| 2017/0263249 A1* | 9/2017 | Akbacak | G10L 15/24 |
| 2018/0270350 A1* | 9/2018 | Engelke | G10L 15/265 |

OTHER PUBLICATIONS

Lo et al., "Development and Evaluation of Automotive Speech Interfaces: Useful Information from the Human Factors and the Related Literature," Hindawi Publishing Corporation International Journal of Vehicular Technology, vol. 2013, Article ID 924170, pp. 1-3 (2013).

\* cited by examiner

PHRASE INTERPRETATION MODULE

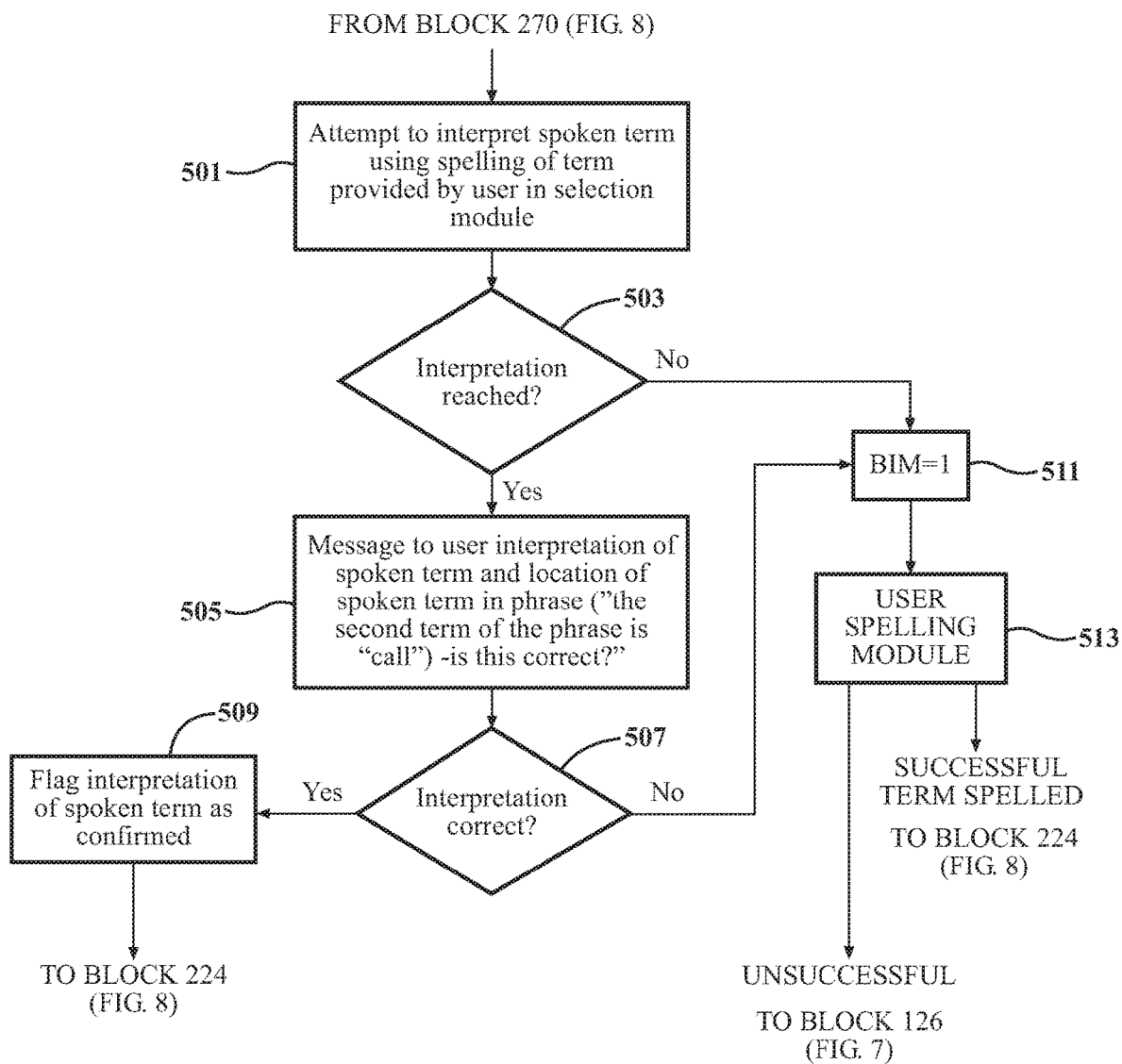

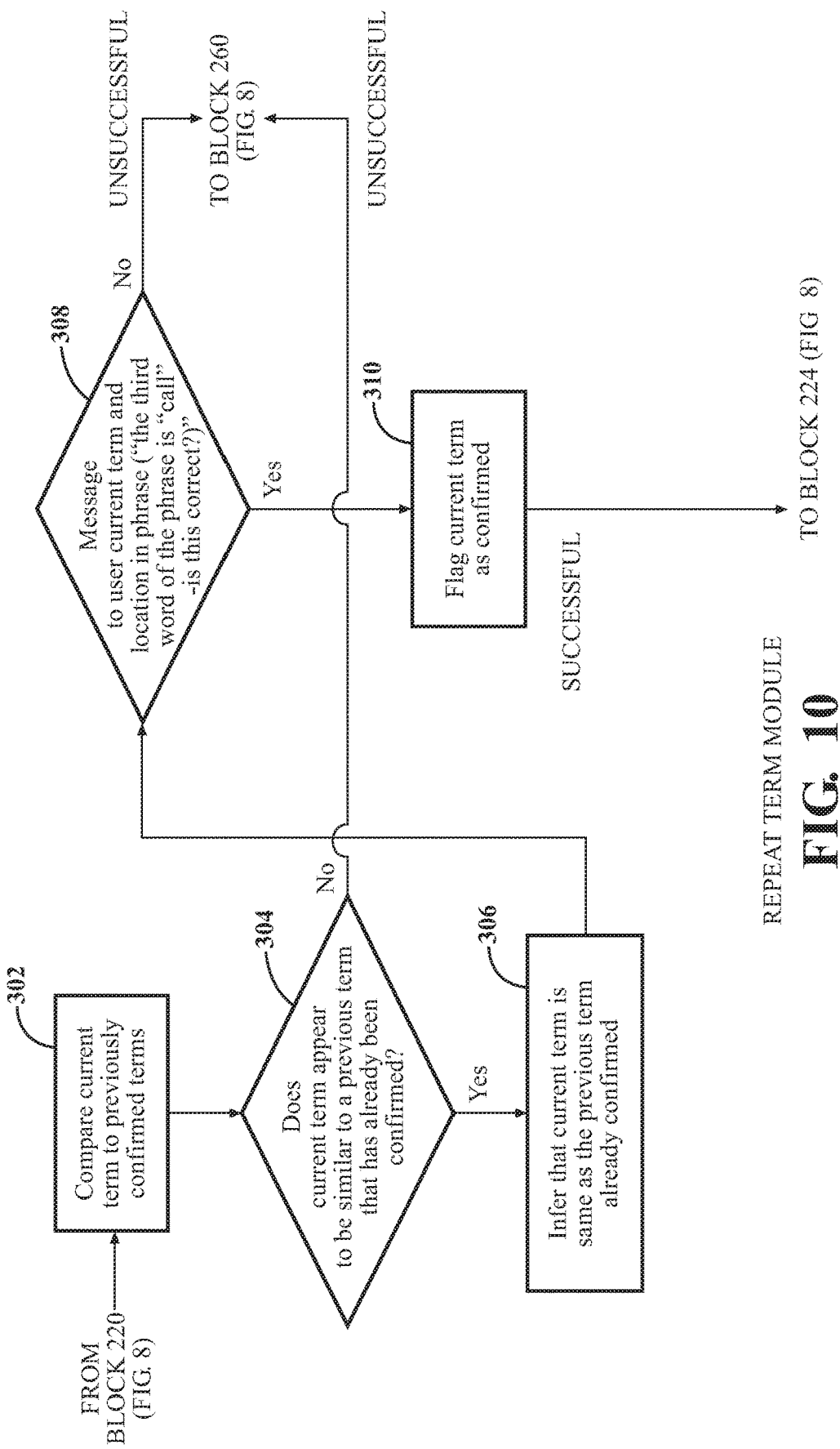

REPEAT CHARACTER MODULE

ASSISTED SPELLING MODULE

SPEECH RECOGNITION SYSTEM WITH INTERACTIVE SPELLING FUNCTION

TECHNICAL FIELD

The present disclosure relates to speech recognition systems and, more particularly, to an interactive speech recognition system configured to enable correction of erroneous system interpretations of spoken phrases, terms, and characters by spelling characters interactively with a user.

BACKGROUND

Speech recognition systems are currently used in many vehicles. However, existing speech recognition technologies may not be capable of accurately interpreting all user utterances. For example, in a user's phone book, there might be some names that do not follow English phonetic conventions. In this case, the user may have a difficult time issuing a command to make a phone call to those names without an effective way to correct any erroneous interpretations by the speech recognition system.

SUMMARY OF THE INVENTION

In one aspect of the embodiments described herein, an interactive speech recognition system is provided for interactively interpreting a spoken phrase. The system includes one or more processors, and at least one memory in communication with the one or more processors. The at least one memory is configured for storing information and program instructions usable by the one or more processors. The at least one memory stores a phrase interpretation module including instructions that, when executed by the one or more processors, cause the one or more processors to attempt to accurately interpret the spoken phrase by interpreting each individual term of the spoken phrase. The at least one memory also stores a term interpretation module including instructions that, when executed by the one or more processors, cause the one or more processors to attempt to accurately interpret each individual term of the spoken phrase not accurately interpreted by the phrase interpretation module, by using a spoken spelling of the term provided by a user. The at least one memory also stores an interactive spelling module including instructions that, when executed by the one or more processors, cause the one or more processors to attempt to interactively spell at least a portion of an individual term of the spoken phrase not accurately interpreted by the term interpretation module, by enabling a user to interactively select at least one individual character of the term of the spoken phrase from a plurality of characters.

In another aspect of the embodiments described herein, an interactive speech recognition system is provided for interactively interpreting a spoken phrase. The system includes one or more processors and at least one memory in communication with the one or more processors, the at least one memory being configured for storing information and program instructions usable by the one or more processors. The at least one memory stores an interactive spelling module including instructions that, when executed by the one or more processors, cause the one or more processors to interactively select a character of a term of a spoken phrase by enabling a user to interactively select a word associated with the character, the word being selectable from one or more words stored in a memory, each word of the one or more words being associated with a distinct individual character.

In another aspect of the embodiments described herein, a method of interactively interpreting a spoken phrase is provided. The method includes steps of: attempting, by a phrase interpretation module of an interactive speech recognition system, to accurately interpret the spoken phrase by interpreting each individual term of the spoken phrase; attempting, by a term interpretation module of the interactive speech recognition system, to accurately interpret each individual term of the spoken phrase not accurately interpreted by the phrase interpretation module, by using a spoken spelling of the term provided by a user; and attempting, by an interactive spelling module of the interactive speech recognition system, to interactively spell at least a portion of an individual term of the spoken phrase not accurately interpreted by the term interpretation module, by enabling a user to interactively select at least one individual character of the term of the spoken phrase from a plurality of characters.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 9B is a flow diagram showing operation of an embodiment of a batch interpretation module of an interactive speech recognition system in accordance with an embodiment described herein.

FIG. 10 is a flow diagram showing operation of an embodiment of a repeat term module of an interactive speech recognition system in accordance with an embodiment described herein.

DETAILED DESCRIPTION

Embodiments described herein relate to an interactive speech recognition system configured for interactively interpreting a spoken phrase. The system first uses a phrase interpretation module to attempt to accurately interpret the spoken phrase by interpreting each individual term of the spoken phrase. If this attempt fails, the system may then use a term interpretation module to attempt to accurately interpret each individual term of the spoken phrase not accurately interpreted by the phrase interpretation module. For terms not accurately interpreted by the term interpretation module, the system attempts to interactively spell at least a portion of the term, by enabling a user to interactively select one or more individual characters of the term from a plurality of characters.

Figure 1:
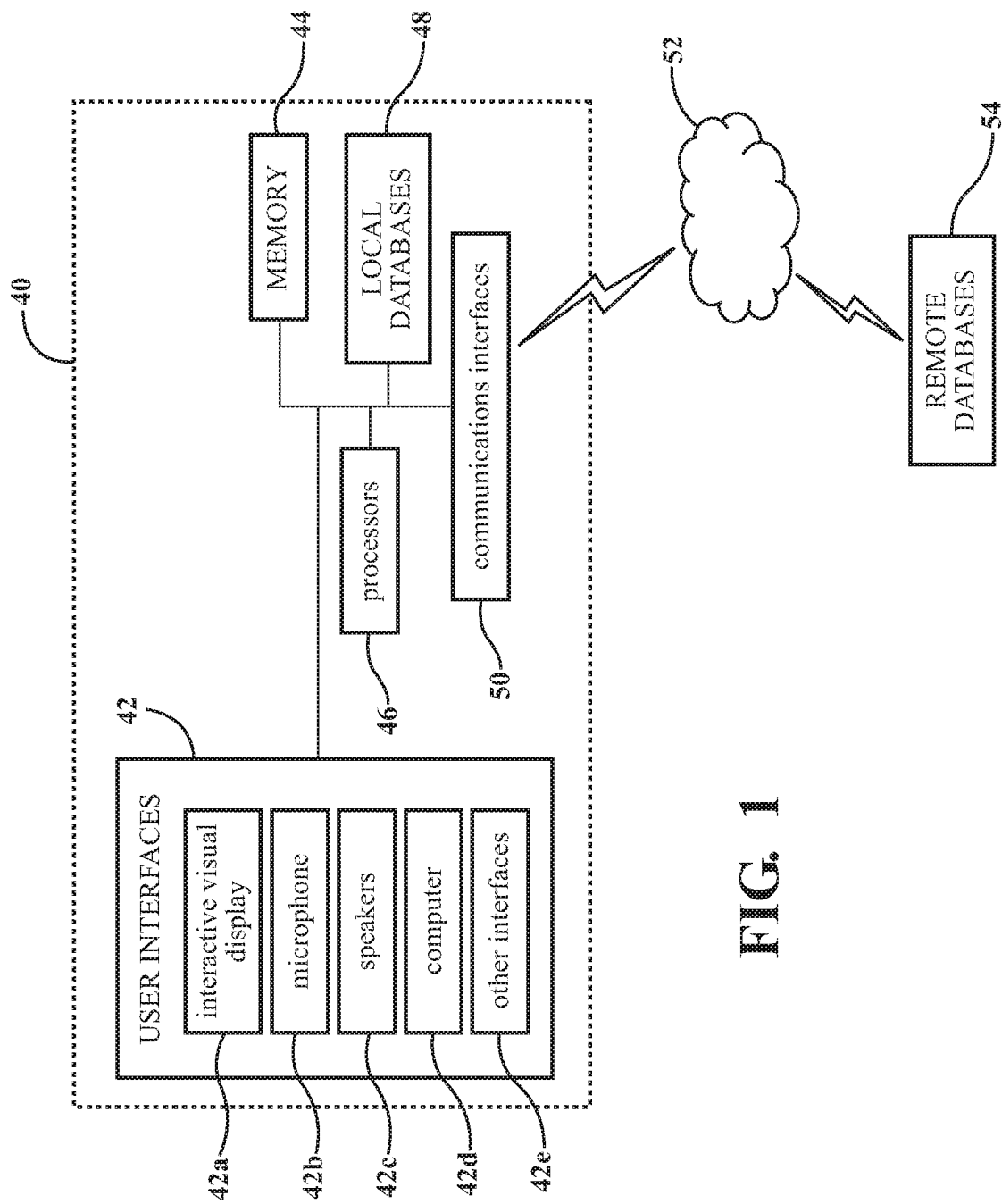
FIG. 1 is a schematic block diagram of an interactive speech recognition system in accordance with an embodiment described herein.

FIG. 1 is a schematic block diagram of an interactive speech recognition system 40 in accordance with an embodiment described herein. The interactive speech recognition system 40 may be configured for interactively interpreting a phrase spoken by a user. Referring to FIG. 1, the interactive speech recognition system 40 may include one or more speech recognition system processors 46 and at least one speech recognition system memory 44 in communication with the one or more processors. The speech recognition system 40 may also include local databases 48 in communication with processor(s) 46 and one or more communications interfaces 50 for communicating with systems and/or elements located remotely from one or more of the other speech recognition system elements. In particular embodiments, communications interfaces 50 may include one or more interfaces configured to communicate with one or more associated systems of elements of a vehicle (not shown in FIG. 1) in which the speech recognition system 40 is operable to control various functions of the vehicle. The speech recognition system 40 may also include (or be in communication with) one or more user interfaces (collectively designated 42) configured to enable communication between a user and the speech recognition system 40.

Recognition system processor(s) 46 may be configured for controlling overall operation of the system 40 and system elements, including computer-readable storage or memory 44, communications interfaces 50, and any other elements of the speech recognition system. As used herein, "processor" means any component or group of components that are configured to execute any of the processes and/or process steps described herein, or any form of instructions needed to carry out such processes/process steps or cause such processes/process steps to be performed. The processor(s) described herein may be implemented with one or more general-purpose and/or one or more special-purpose processor(s). Examples of suitable processor(s) include microprocessors, controllers, microcontrollers, DSP processors, and other circuitry that can execute software. The processor(s) can include at least one hardware circuit (e.g., an integrated circuit) configured to carry out instructions contained in program code. In arrangements in which there is a plurality of processors, such processors can work independently from each other or one or more processor(s) can work in combination with each other.

Speech recognition system processor(s) 46 may be configured to parse a spoken phrase into individual terms for storage in the memory 44. Processor(s) 46 may be configured to detect pauses between terms of the spoken phrase during user utterance of the phrase, for example. The speech recognition system processor(s) 46 may also be configured to attempt to interpret a spoken phrase, term, or character by comparing the elements of the spoken phrase, term, or character with recognizable phrases, terms, or characters stored in the various speech recognition system databases and other available information sources. For example, as described herein, processor(s) 46 may be configured to attempt to interpret a term stored in memory using a spoken spelling of the term provided by a user. The sounds of the spoken characters of the spelled term may be saved in memory and compared with a common speech recognition database 48a containing associations between phonemes, characters, and spoken sounds.

The processor(s) 46 may be configured to implement known natural language processing (NLP) algorithms, statistical natural language processing (SNLP) algorithms and/or other known algorithms capable of interpreting (or attempting to interpret) speech input. Speech recognition system processor(s) 46 may also be configured to query, operate, and/or otherwise interact with other elements of the speech recognition system 40 as needed to perform the speech recognition functions described herein. Speech recognition system processor(s) 46 may also be configured to interact with systems or elements in communication with the speech recognition system 40, to facilitate implementation of any spoken commands accurately interpreted by the speech recognition system.

As used herein, a "term" is a grouping of consecutive individual characters (forming a word or a name, for example) which may be spoken by a user and received by the speech recognition system 40. A "phrase" is a grouping of multiple terms. Successive terms of the phrase as spoken by a user may be separated by pauses, which the speech recognition system may be configured to detect. A "character" is an individual letter or number from which terms and phrases may be constructed. Phrases, terms, and characters as spoken by the user may be configured to convey requests, questions, answers to queries and/or other information to the speech recognition system 40.

Parsing of a spoken phrase into individual terms and user spelling of individual terms may be aided by intentional and discernible time pauses inserted by a user between the spoken terms and/or between individual characters of a term. In another arrangement, explicit pauses may be inserted between adjacent terms and/or between adjacent characters of terms. In yet another arrangement, speech recognition system processor(s) 46 may reference spelling databases 48b or dictionaries during processing of a term to attempt to detect when the end of a term is reached, by comparing the term being processed with the databases/dictionaries, for example, after the processing of each individual character of the term. If the system fails to detect a pause between adjacent spoken terms of a phrase, the adjacent terms may be processed as a single spoken term.

Figure 2:
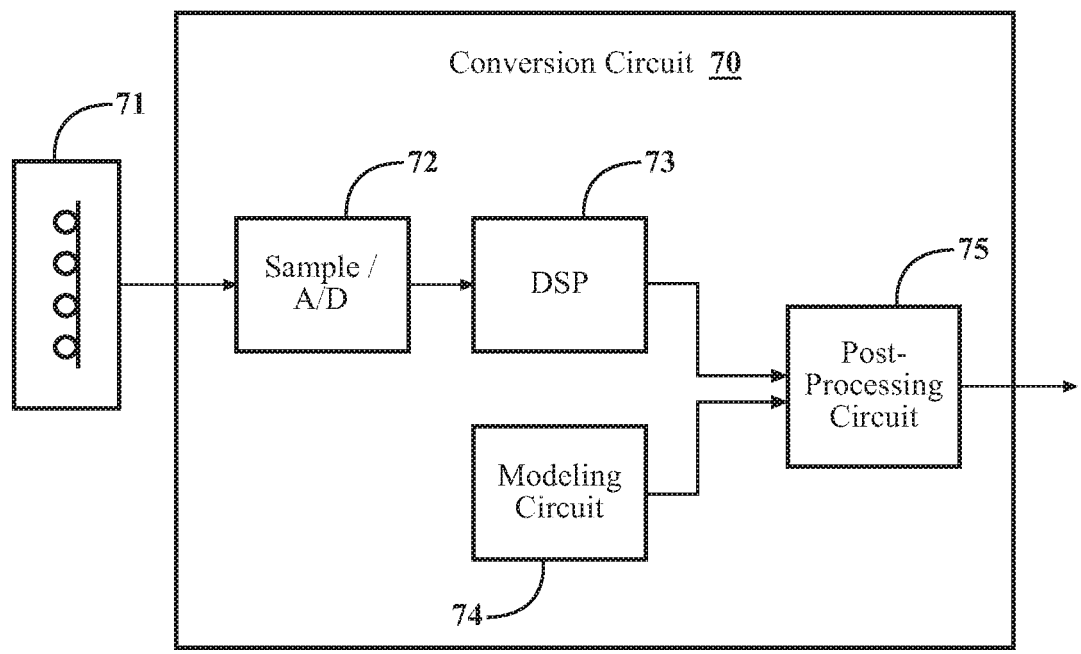
FIG. 2 is a schematic view of one example of a conversion circuit configured to convert a spoken phrase, term, and/or character from an analog form to a digital form.

Referring now to FIG. 2, the speech recognition system processor(s) 46 may incorporate (or be communication with) one or more conversion circuits or modules configured to transform analog speech (i.e., phrases, terms, and/or characters) into an associated digital representation suitable for analysis and comparison by the processor(s) 46. FIG. 2 is a schematic view of one example of a conversion circuit 70 configured to convert a spoken phrase, term, and/or character from an analog form as received by a microphone, to a digital form which may be compared (using processor(s) 46) to phrases, terms, and/or characters found in a database or another source.

An analog-to-digital converter 72 may sample and convert analog speech signals from the microphone 71 into sampled digital signals. The analog speech signals may be sampled at about a 10-20 KHz sample rate. Other sampling rates may be used. A digital signal processor (DSP) 73 or other processor may process the sampled digital signals. The DSP 73 may transform the sampled digitized speech signal into a time domain signal, and may identify various parameters, such as frequency, frequency spectrum, energy level, power density, and other parameters. The DSP 73 may include finite impulse response (FIR) filters, infinite impulse response (IIR) filters, and other filter components.

A phoneme may be defined as the smallest sound unit in a language that is capable of conveying a distinct meaning, such as the "s" of sing and the "r" of ring. Human speech may include a sequence of phonemes. The phonemes of speech may be modeled in a known manner using a "Hidden Markov Model," which may comprise a probability density function. A plurality of Hidden Markov Models or processes may used to recognize individual words. A speech modeling circuit 74 may communicate with the DSP 73, and may apply one or more Hidden Markov processes or other modeling processes. The conversion circuit 70 may apply a linear predictive coding (LPC) process or other suitable process. A post-processing circuit 75 may process the output from the DSP 73 and/or the modeling circuit 74 and may apply filtering or other processes.

The conversion circuit 70 may include hardware components and/or software components, and may apply speech recognition processes to identify and extract individual terms in the input phrase issued by the user. The conversion circuit 70 may also include elements in addition to the elements shown, if necessary to perform the functions described herein.

Referring again to FIG. 1, user interfaces 42 may include elements such as interactive visual displays 42a, microphones 42b, speakers 42c, computers 42d, and/or any other interface(s) 42e enabling communication with the speech recognition system processor(s) 46 and which enable and/or facilitate interaction between the speech recognition system and a user.

Figure 3:
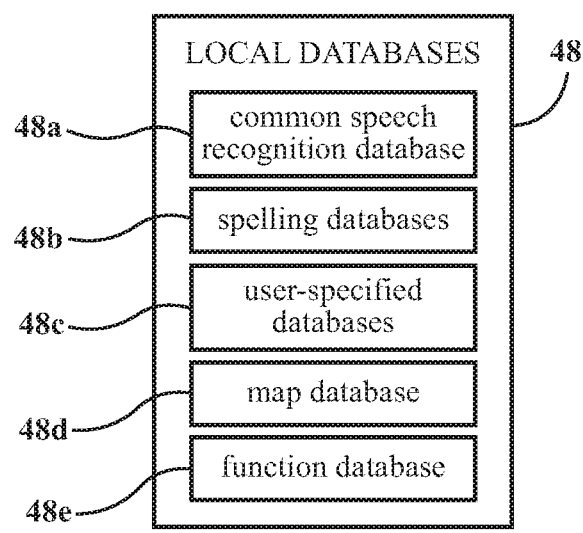
FIG. 3 is a schematic block diagram showing samples of local databases which may be included in an embodiment of the interactive speech recognition system.

Referring to FIG. 3, local databases 48 may be databases located in relatively close proximity to the speech recognition system memory 44 and processor(s) 46. The processor(s) 46 may access local databases 48 for pertinent information before attempting to access the remote databases 54. For example, in attempting to interpret a phrase, term, or character, the speech recognition system 40 may first refer to local databases 48. Remote databases 54 may be databases which are located remotely from the speech recognition system memory 44 and processor(s) 46 and/or which are intended to supplement the local databases 48. The remote databases 54 may include, for example, information not contained in the local databases 48 or which may not be frequently used by the speech recognition system 40. Remote databases 54 may be accessed via one or more communications networks 52 using one or more communications interfaces 50 incorporated into the speech recognition system 40 or in communication with one or more elements of the speech recognition system. For example, communications interfaces 50 may be configured to enable access to the Internet or other remote information sources, to aid in interpreting the spoken phrase, term, or character. During the process of interpreting the phrase, term, or character, any of the databases may be referenced.

In one or more arrangements, all of the information needed for processing a spoken phrase as described herein may be located in local databases 48 or otherwise in relatively close proximity to the speech recognition system memory 44 and processor(s) 46. In other arrangements, all of the information needed for processing a spoken phrase as described herein may be in remote databases 54 or otherwise located remotely from the speech recognition system memory 44 and processor(s) 46.

The common speech recognition database 48a may include a collection of system-recognizable phonemes or sounds, each phoneme or sound associated with one or more phrases, terms, and/or characters. The common speech recognition database 48a may also contain associations between known terms having various combinations of phonemes in various relationships to each other. Thus, a spoken term formed from a group of characters (whether spelled by a user or unspelled), and with each character having a specific sound, may be compared to the common speech recognition database 48a to attempt to find known terms having the same phonemes in the same relationship as the spoken term. This may help interpret or identify a spoken term and/or character. The common speech recognition database 48a may serve as a primary reference for the speech recognition system 40 when the system attempts to interpret a spoken phrase, term, or character.

Spelling databases 48b may include any information selected to aid the speech recognition system 40 in interpreting individual characters and/or to aid in facilitating spelling or selection of a character by a user. The spelling databases 48b may include one or more libraries containing character-keyword associations (user-predetermined or otherwise) as described herein.

User-specified databases 48c may include such information as contact lists, phone numbers, to-do lists, and other elements which may be accessed, changed, and/or implemented using the speech recognition system 40.

Depending on the particular application of the speech recognition system, local databases may include one or more databases configured for specialized functions. For example, in a vehicle application in which the speech recognition system communicates with a navigation system such as a vehicle navigation system, the local databases 48 may include a map database 48d storing navigation destinations, point of interests, digital maps, commands or other information. The map database 48d may contain entries of worldwide, continent-wide, and country-wide destinations. Destinations and/or points of interest may include a plurality of fields, such as country, state, city, street name, house number, house number suffix, supplementary information, and other information.

The function database 48e may store system-recognized phrases, portions of phrases, and/or terms, along with one or more instructions associated with each phrase, portion of a phrase, and/or term. Each instruction may include one or more executable commands or specify location(s) of one or more executable commands. Each instruction may alternatively be configured to initiate one or more pre-determined strings of executable commands. When a system interpretation of a spoken phrase or term is confirmed by a user as described herein, the speech recognition system processor(s) 46 may initiate implementation of the phrase or term by matching the user-confirmed phrase or term with a recognized phrase or term stored in the function database 48e. The speech recognition system processor(s) 46 may then forward the command or command string(s) associated with the user-confirmed phrase or term to other systems or elements (such as a cellular phone or a vehicle navigation system) by which the commands may be implemented.

Figure 4:
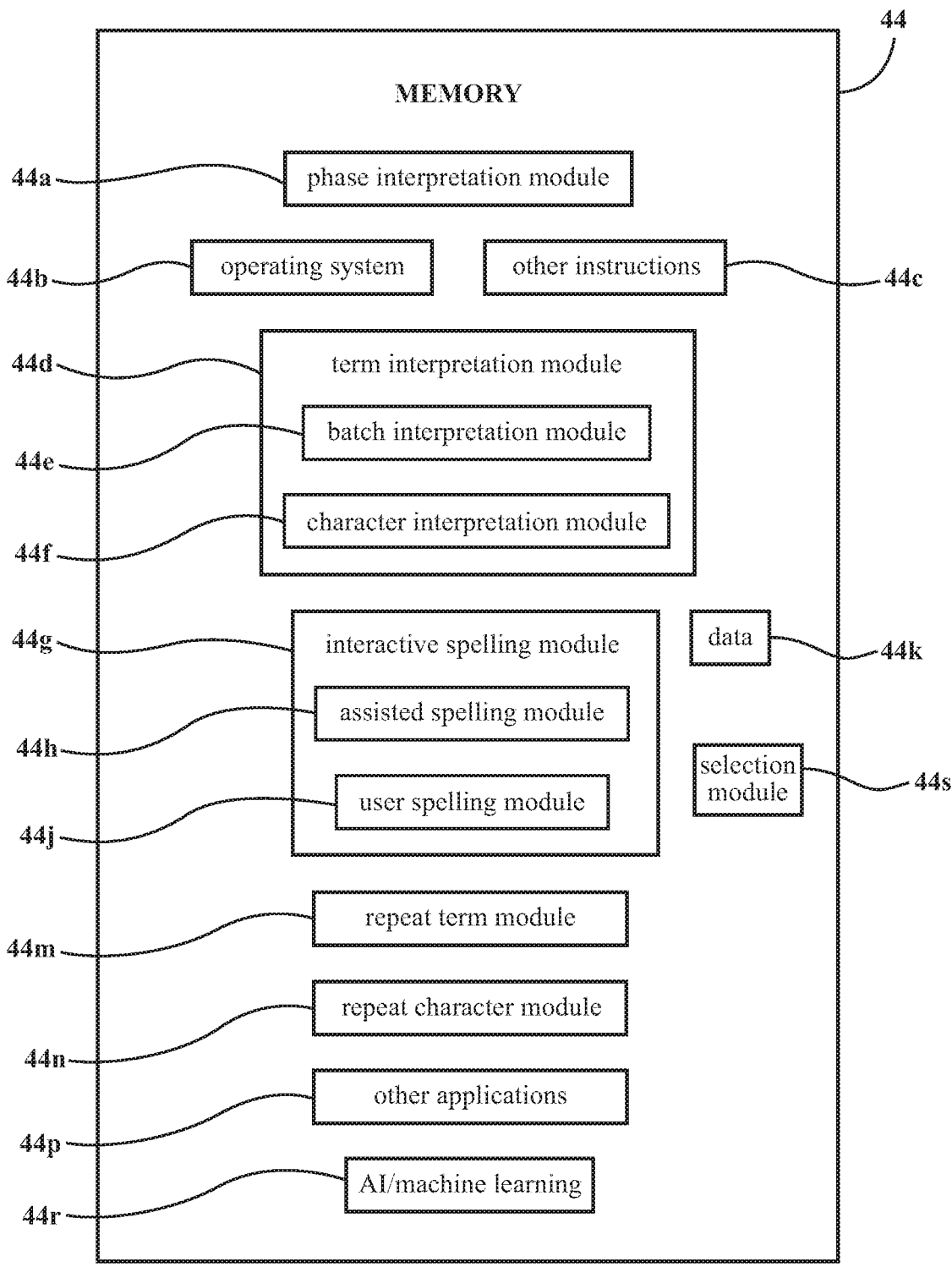
FIG. 4 is a schematic block diagram showing an interactive speech recognition system memory in accordance with an embodiment described herein.

Referring to FIG. 4, the speech recognition system memory 44 may be configured to receive and store phrases, terms, and/or characters spoken by a user. The phrases, terms, and/or characters stored in the memory 44 may be referenced by system processor(s) 46 for comparison with phrases, terms, and characters stored in the various speech recognition system databases. The phrases, terms, and/or characters stored in the memory 44 may also be compared with phrases, terms, and characters not stored in the speech recognition system 40, but which may be recognizable by the system and available from other sources, such as Internet sources available via a suitable communications interface. The phrases, terms, and/or characters stored in the memory 44 may also be referenced by system processor(s) 46 for any other speech processing functions. Memory 44 may comprise a single memory or the memory 44 may be partitioned into multiple memories.

Memory 44 may include various fields or blocks configured for storing the phrases, terms, and/or characters spoken by a user, and also for storing values of various parameters associated with processing operations performed on the phrases, terms, and/or characters in an attempt to accurately interpret the spoken phrases, terms, and/or characters. In alternative arrangements, the memory blocks configured for storing values of the various parameters associated with the processing operations may be located in a memory different from the memory 44. In such arrangements, the memory blocks configured for storing the values of the various parameters associated with the processing operations may be provided with indicators or maps associating these values with the corresponding spoken phrases, terms, and/or characters stored in the memory 44.

In one example, in one or more arrangements, a spoken phrase received from a user may be received and stored in memory 44. Speech recognition system processor(s) 46 may be configured to parse the spoken phrase into individual terms. Each of the separate terms may have an associated location or field in the memory 44. For each individual term of the phrase, a memory field may be allocated for storing a value indicating a location of the term in the phrase.

As used herein, a location of a term in a phrase may be a position of the term in the phrase relative to other terms in the phrase. For example, in the phrase "Please call Bob Williams", the location of the term "Bob" may be designated "third" or assigned a numerical value of "3" for purposes of processing speech input by the speech recognition system. The location of the term in the phrase may serve as place marker, so that the speech recognition system can reference the term by its location in the phrase for analysis and output/queries to the user, as described herein.

Also associated with each individual term may be a field for storing a speech recognition system interpretation of the term. The system interpretation of the term may be a term that was matched to the term stored in the memory 44 as a result of operations by the speech recognition system 40 to attempt to interpret or identify the term (by comparison with elements found in databases or other sources, for example).

Also associated with each individual term may be a field for storing a value of a confirmation flag. The confirmation flag may or may not have a default value. The confirmation flag may be set to a particular value responsive to a user confirming that an interpretation of the term made by the speech recognition system processor(s) 46 is accurate.

Also associated with each individual term may be a field for storing a value of an uninterpreted term flag. The uninterpreted term flag may or may not have a default value. The uninterpreted term flag may be set to a particular value responsive to a failure by the speech recognition system processor(s) 46 to interpret the term (i.e., a failure by the processor(s) to match the term stored in the memory 44 with a stored or accessible term recognized by the system).

Each of the separate characters of a term may also have an associated location or field in the memory 44. For each individual character of the term, a memory field may be allocated for storing a value indicating a location or position of the character in the term. A location of a character in a term may be a position of the character in the term relative to other characters in the term. For example, in the term "call", the location of the character "c" may be designated "first" or assigned a numerical value of "1" for purposes of processing speech input by the speech recognition system. The location of the character in the term may serve as place marker, so that the speech recognition system can reference the character by its location in the term for analysis and output/queries to the user, as described herein.

Also associated with each individual character may be a memory field for storing a system interpretation of the character. The system interpretation of the character may be a character that was matched to the character stored in the memory 44, as a result of operations by the speech recognition system to attempt to interpret or identify the character (by comparison with elements found in databases or other sources).

Also associated with each individual character may be a memory field for storing a value of a confirmation flag. The confirmation flag may or may not have a default value. The confirmation flag may be set to a particular value responsive to a user confirming that an interpretation of the character made by the speech recognition system processor(s) 46 is accurate.

Also associated with each individual character may be a memory field for storing a value of an uninterpreted character flag. The uninterpreted character flag may or may not have a default value. The uninterpreted character flag may be set to a particular value responsive to a failure by the speech recognition system processor(s) 46 to interpret the character (i.e., a failure by the processor(s) to match the character stored in the memory with a stored or accessible character recognized by the system).

The speech recognition system memory 44 may be a random-access memory (RAM), read-only memory (ROM), a hard-disk drive, a flash memory, or other suitable memory for storing the various modules and other elements located in the memory 44. The various modules described herein may include, for example, computer-readable instructions that when executed by the processor(s) 46, cause the processor(s) to perform the various functions disclosed herein.

Referring again to FIG. 4, in one or more arrangements, the speech recognition system memory 44 may store a phrase interpretation module 44*a*, a selection module 44*s*, a term interpretation module 44*d*, and an interactive spelling module 44*g*. The memory 44 may also store additional elements such as an operating system 44*b*, data 44*k*, other instructions 44*c*, and other applications 44*p*, which may aid in the performance of the speech recognition system functions described herein.

In one or more embodiments, the phrase interpretation module 44*a* may include instructions that, when executed by the processor(s) 46, cause the processor(s) to attempt to accurately interpret a spoken phrase by interpreting each individual term of the spoken phrase. If an interpretation of a term is reached, the interpretation and an associated location of the term in the phrase are stored in memory 44. If an interpretation is not reached, an "uninterpreted term" marker is stored in memory 44, along with an associated location of the uninterpreted term in the phrase. Thus, each term of the phrase is flagged in memory 44 as either having an interpretation or not having an interpretation.

More particularly, the phrase interpretation module 44*a* may include instructions that, when executed by the processor(s) 46, cause the processor(s) to attempt to interpret a term of the spoken phrase. If an interpretation of the term was reached, the interpretation of the term and a location of the term in the spoken phrase may be stored in memory. If an interpretation of the term was not reached, an indication that the term is uninterpreted and a location of the uninterpreted term in the spoken phrase may be stored in memory. The preceding steps may be repeated for each term in the spoken phrase. Then, if an interpretation was reached for each term of the spoken phrase, an interpreted spoken phrase may be communicated to a user. The interpreted spoken phrase may be formed by the interpretations of the terms as communicated in sequence according to the locations of the terms in the interpreted spoken phrase. The system may receive a response from the user in reply to communication of the interpreted spoken phrase. The response may indicate either that the interpreted spoken phrase is correct or incorrect. If the response indicates that the interpreted spoken phrase is correct, the system may initiate implementation of the spoken phrase.

If the phrase interpretation module 44*a* fails to accurately interpret each term of the spoken phrase, processing of the phrase may proceed to the selection module 44*s*. The selection module 44*s* may determine if an interpretation of a term was reached in the phrase interpretation module 44*a*. If an interpretation was reached, the system may query a user for confirmation/non-confirmation of the accuracy of the interpretation. If the interpretation is accurate, the system may flag the interpretation of the term as confirmed by the user, and proceed to evaluate the next term (if any) in a similar manner. If an interpretation of a term was not reached in the phrase interpretation module 44*a*, the selection module 44*s* may determine if there are any previously interpreted terms of the spoken phrase that were confirmed as accurate by the user. If accurate previously interpreted terms are available, the system may call a repeat term module 44*m* to attempt to determine if the term currently being evaluated in the same as one of the previous terms. If the term currently being evaluated in the same as one of the previous terms, the current term may be interpreted to be the same as the previous term. This interpretation may be communicated to the user for confirmation/non-confirmation. If the user confirms the interpretation as accurate, the system confirms or flags the interpretation of the term as accurate.

If the user indicates that an interpretation of the term is incorrect, the user may be queried to spell the unidentified term by voice, character by character. If there are pauses detected between any of the characters in the spoken spelling, control may then transfer to the character interpretation module 44*f*. If there are no pauses detected between any of the characters in the spoken spelling, control may transfer to the batch interpretation module 44*e*. Control does not pass to either the character interpretation module 44*f* or the batch interpretation module 44*e* until the user has spelled the term in the selection module 44*s*.

The term interpretation module 44*d* attempts to accurately interpret each individual term of the spoken phrase not accurately interpreted by the phrase interpretation module 44*a* by using the spoken spelling of the term provided by the user in the selection module. The memory may store a batch interpretation module 44*e* and/or a character interpretation module 44*f* (both of which are described in greater detail below) for use by the term interpretation module 44*d*.

The batch interpretation module 44*e* attempts to interpret the unidentified term using the spoken spelling provided in the selection module 44*s*. Since there are no pauses here between spoken characters, the system may not be able to distinguish between individual characters. Thus, the batch interpretation module 44*e* may analyze a block of characters to attempt to construct a proposed term for user confirmation/non-confirmation.

In one or more arrangements, the batch interpretation module 44*e* may compare the sounds of the characters in the stored spoken term to a database (such as common speech recognition database 48*a*) containing phonemes associated with particular characters and spoken sounds, to try construct a term which contains the same phonemes in the same relationship as the spoken spelled term. The system may then compare the constructed term with a database containing known words/terms having the same phonemes in the same relationship as the spoken spelled term. If this comparison produces a proposed known word, the word may be sent to the user for confirmation. If no proposed word is produced, control may go to spelling module.

The character interpretation module 44*f* attempts to interpret each uninterpreted character of a term, using the spoken spelling of the term provided by the user in the selection module 44*s*. Since there are pauses between the spoken characters in this version of the spoken term, the system should be able to distinguish between individual characters. The system may compare a sound of a spoken character to a database (such as database 48*a*) containing phonemes associated with particular characters and spoken sounds, to reach proposed interpretations of individual letters. If no interpretation is reached using this method, control may pass to the repeat character module (described below). If an interpretation of the character is reached in the character interpretation module, the interpretation may be communicated to a user for confirmation/non-confirmation. If the interpretation of the character is not confirmed, control may transfer to the interactive spelling module 44*g* to attempt to spell the character.

The character interpretation module 44*f* may include instructions that, when executed by the processor(s) 46, cause the processor(s) to attempt to interpret a character of the term using a spoken spelling of the term provided by the user. If an interpretation of the character was reached, the system may communicate to the user the interpretation of the character, and query the user for confirmation/non-confirmation. The system may then receive a response from the user in reply to communication of the interpretation of the character. The response may indicate either that the interpretation of the character is correct or incorrect. If the response indicates that the interpretation of the character is correct, the system may confirm the interpretation of the character.

The speech recognition system memory 44 may also store a repeat character module 44*n* which may be called upon from the character interpretation module 44*f*. The repeat character module 44*n* attempts to identify a character by comparing the character to other characters in the spoken phrase which were previously accurately interpreted. If the characters appear to be the same, the speech recognition system processor(s) 46 may infer that the characters are the same and interpret the character in question to be the same as the previous, confirmed character. More particularly, the repeat character module 44*n* may include instructions that, when executed by the one or more processors, cause the one or more processors to estimate if a current character is the same as a character which was previously accurately interpreted. If the current character is estimated to be the same as a character which was previously accurately interpreted, the system may interpret the current character to be the same as the character which was previously accurately interpreted.

The speech recognition system memory 44 may also store a repeat term module 44*m* which may be called upon from the selection module 44*s*. The repeat term module 44*m* attempts to identify a term by comparing the term to other terms in the spoken phrase which were previously accurately interpreted. If the terms appear to be the same, the system may infer that the terms are the same and interpret the current term to be the same as the previous, confirmed term. More particularly, the repeat term module 44*m* may include instructions that, when executed by the processor(s) 46, cause the processor(s) to estimate if a current term is the same as a term which was previously accurately interpreted. If the current term is estimated to be the same as a term which was previously accurately interpreted, the system may interpret the current term to be the same as the term which was previously accurately interpreted. If the current term is interpreted to be the same as a term which was previously accurately interpreted, the system may communicate to a user, for confirmation/non-confirmation, the interpretation of the current term. The system may then receive a response from the user in reply to communication of the interpretation of the current term. The response may indicate either that the interpretation of the current term is correct or incorrect. If the response indicates that the interpretation of the current term is correct, the system may confirm the interpretation of the current term.

The repeat term module 44*m* and repeat character module 44*n* may reduce the time required to accurately interpret a spoken phrase or term by using, as a basis for comparison, terms and characters previously confirmed by the user as accurate.

The interactive spelling module 44*g* is configured to facilitate spelling of characters of a spoken phrase which have not been previously accurately interpreted by the speech recognition system 40. More specifically, the interactive spelling module 44*g* may include instructions that, when executed by the processor(s), cause the processor(s) to attempt to interactively spell at least a portion of an individual term of the spoken phrase not accurately interpreted by the term interpretation module, by enabling a user to interactively select at least one individual character of the term of the spoken phrase from a plurality of characters.

The speech recognition system memory 44 may store an assisted spelling module 44*h* for use by the interactive spelling module 44*g*. The assisted spelling module 44*h* is configured to select a plurality of "best guess" options for interpretation of a character, and to present those options for user selection. The user may select a character from the options presented. The assisted spelling module 44*h* may include instructions that when executed by the one or more processors cause the one or more processors to determine a plurality of proposed interpretations of a character, and then communicate to a user the plurality of proposed interpretations of the character. The system may then receive a selection by the user of one of the proposed interpretations of the plurality of proposed interpretations. The system may then echo to the user (for confirmation/non-confirmation) the user's selection of the one of the proposed interpretations of the plurality of proposed interpretations. The system may then receive a response from the user in reply to echoing to the user the user's selection of the one of the proposed interpretations of the plurality of proposed interpretations. The response may indicate either that the echoed selection is correct or incorrect. If the response indicates that the echoed selection is correct, the system may confirm the interpretation of the character.

The speech recognition system memory 44 may also store a user spelling module 44*j* for use by the interactive spelling module 44*g*. If a character of a spoken phrase or term is not accurately interpreted by implementation of the assisted spelling module 44*h*, processing of the phrase or term may proceed to the user spelling module 44*j*. The user spelling module 44*j* prompts the user to select a character of a term based on its association with a keyword which is stored in a memory and which is phonetically recognizable by the system. Each character is associated with a single, distinctive keyword configured to facilitate recognition of the character by the speech recognition system 40. The user selects the character by speaking the character and the keyword in the format "A" is for apple, "B" is for boy", etc., so that the keyword is recited in association with the selected character. The characters and their associated keywords may be stored in one or more of local databases 48.

The user spelling module 44*j* may include instructions that when executed by the one or more processors cause the one or more processors to communicate to a user for selection a spoken representation of each character in a memory containing a plurality of characters from which a term in a spoken phrase may be formed, the memory also containing a spoken representation associated with each character of the plurality of characters. The system may then receive, from a user, a user-spoken representation associated with a character of the plurality of characters selected by the user. The system may then echo to the user, for confirmation/non-confirmation, the user-spoken representation associated with the character of the plurality of characters selected by the user. The system may then receive a response from the user in reply to echoing to the user the user-spoken representation associated with the character of the plurality of characters selected by the user. The response may indicate either that the echoed user-spoken representation is correct or incorrect. If the response indicates that the echoed user-spoken representation is correct, the system may confirm the interpretation of the character.

In one or more particular arrangements, the speech recognition system 40 may be configured to enable a user to specify keywords to be associated in memory with a given character. This may enable the user to more quickly identify to the speech recognition system 40 a selected character and associated keyword, because the user may be more familiar with a keyword that the user has personally chosen. The speech recognition system may enable the user, via the user interfaces, to replace an existing stored keyword associated with a selected character, with a user-selected or user-predetermined keyword. For example, "B as in boy" may be replaced in a database with "B as in bike".

Operation of an embodiment of the speech recognition system 40 will now be described with reference to FIGS. 5-12B.

A phrase, term, or character of a spoken phrase or term is considered to be "interpreted" when the speech recognition system is able to find a proposed match for the spoken phrase, term, or character (in a database or other available information source, for example) or is otherwise able to find a proposed interpretation which can be communicated to a user for confirmation/non-confirmation. This proposed interpretation of the phrase, term, or character may then be communicated to a user for confirmation. If the user confirms to the speech recognition system the proposed interpretation, the proposed interpretation of the phrase, term, or character is then considered to be accurate or "confirmed". Thus, when the processor(s) 46 determine that a phrase, term, or character in the memory 44 matches a phrase, term, or character known or recognized by the speech recognition system, an interpretation of the phrase, term, or character stored in the memory has been reached. This interpretation of the phrase, term, or character may be communicated to a user for confirmation. If the user confirms the system interpretation of the phrase, term, or character, this interpretation may be flagged as a confirmed or accurate interpretation of the phrase, term, or character.

Figure 5:
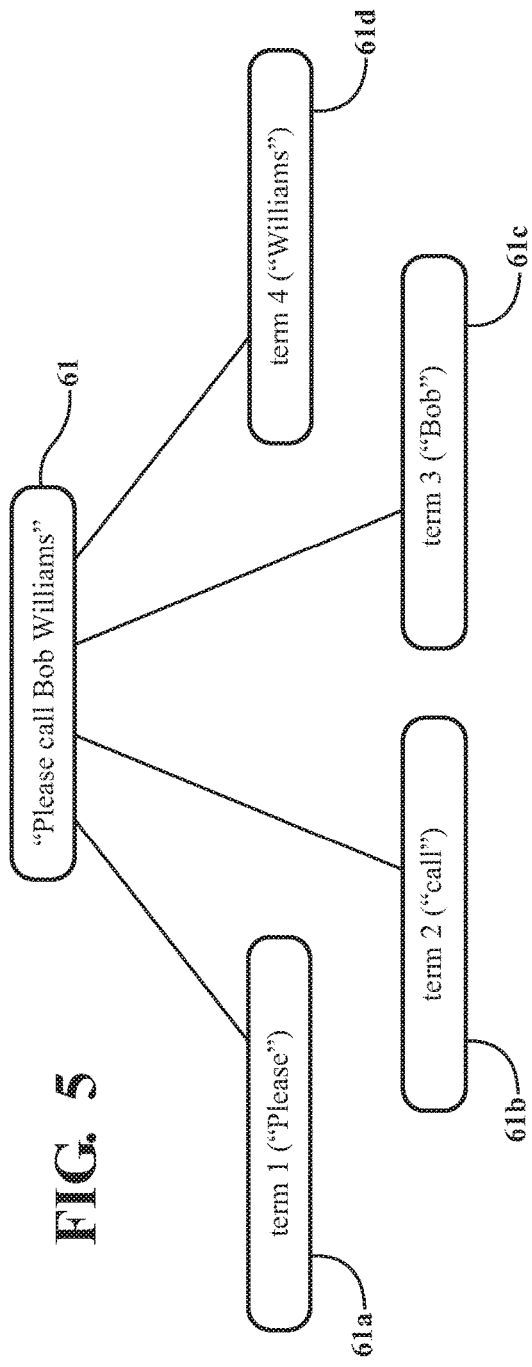
FIG. 5 is a schematic diagram showing one example of how a spoken phrase may be stored in a memory of the interactive speech recognition system.
Figure 6:
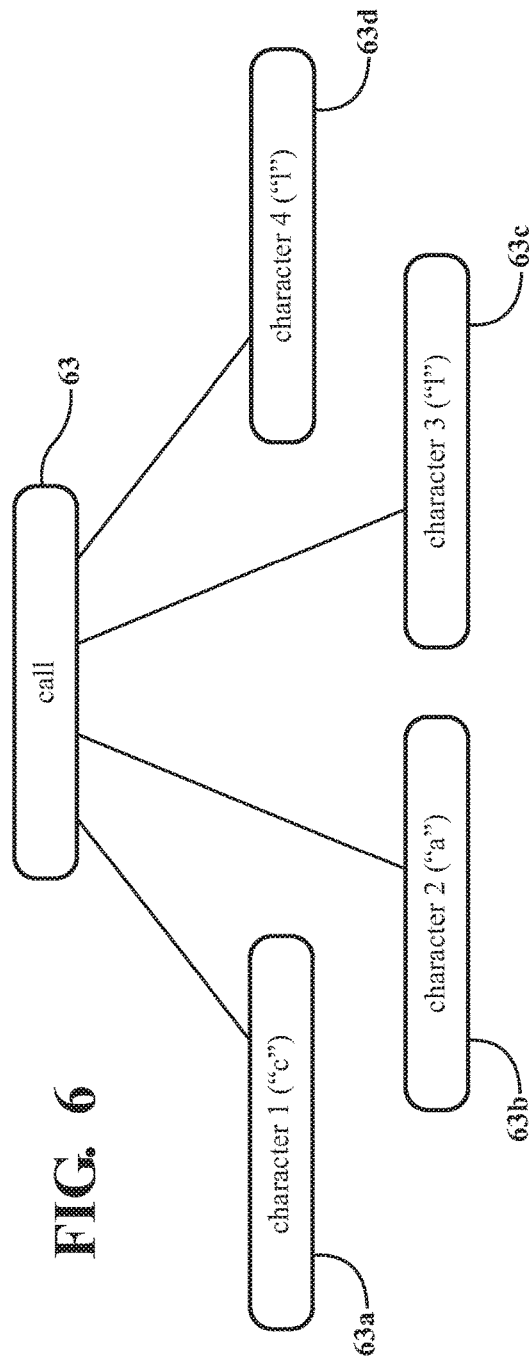
FIG. 6 is a schematic diagram showing one example of how a single term of the spoken phrase of FIG. 5 may be stored in a memory of the interactive speech recognition system.

FIG. 5 is a schematic diagram showing one example of how a spoken phrase may be parsed and stored in the memory 44. FIG. 6 is a schematic diagram showing one example of how a single term of the spoken phrase of FIG. 5 may be stored in the memory 44. Referring to FIG. 5, as an example, the speech recognition system may be tasked with interpreting the spoken phrase 61 which reads "Please call Bob Williams". The spoken phrase 61 may be received, parsed, and stored in memory 44 as previously described.

Also, as seen in FIG. 5, each term of the phrase 61 may be associated with a relative location of the term in the phrase. For example, for purposes of processing, the term "Please" may be designated the first term (or term 1) 61a in the phrase, the term "call" may be designated the second term (or term 2) 61b, the term "Bob" may be designated the third term (or term 3) 61c, and the term "Williams" may be designated the fourth term (or term 4) 61d. Similarly, as seen in FIG. 6, each character of each term may be associated with a relative location of the character in the term. For example, for purposes of processing of the term "call" 63, the character "c" in the term "call" may be designated the first character (or character 1) 63a in the term, the character "a" may be designated the second character (or character 2) 63b, the first occurrence of character "1" may be designated the third character (or character 3) 63c, and the second occurrence the character "1" may be designated the fourth character (or character 4) 63d.

Figure 7:
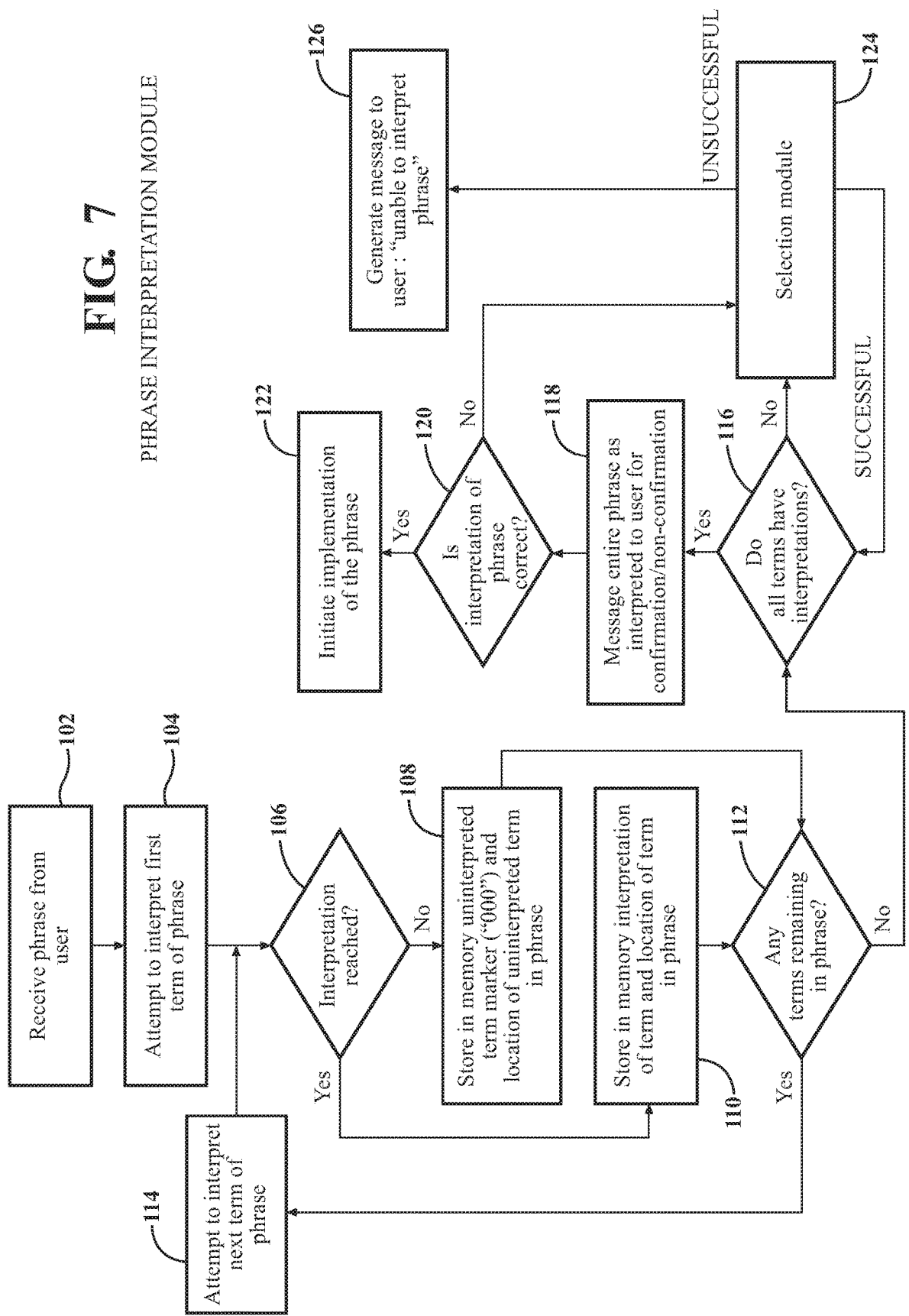
FIG. 7 is a flow diagram showing operation of an embodiment of a phrase interpretation module of an interactive speech recognition system in accordance with an embodiment described herein.

Referring now to FIG. 7, the phrase interpretation module 44a attempts to accurately interpret a spoken phrase by interpreting each individual term of the spoken phrase. The system may attempt to identify phrases, terms, and characters as described herein without user feedback, using any of a variety of sources, including databases and memories internal to the system, and online sources and other sources external to the system. In block 102, a phrase is received from a user, for example, via one of microphones 42b. The phrase interpretation module 44a attempts to interpret each term of the phrase in sequence (starting in block 104 with the first term). If an interpretation of a term is reached (block 106), the interpretation and an associated location of the term in the phrase (e.g., 1st term, 2nd term, etc.) are stored in memory 44 (block 110). If an interpretation is not reached, an "uninterpreted term" marker is stored in memory 44 (block 108), along with an associated location of the uninterpreted term in the phrase. The "uninterpreted term" marker may be a null value or any other suitable indicator that the term is currently uninterpreted. If there are determined to be any terms remaining in the phrase (block 112), this procedure may then be repeated (starting in block 114) for the next term in the phrase and the remaining terms, until the system has determined whether or not all terms have been interpreted. Thus, each term of the phrase is flagged as either having an interpretation or not having an interpretation.

After interpretations of all the terms have been attempted, if an interpretation of every term has been reached by the system (block 116), the system may communicate a phrase (comprising the interpreted terms positioned in sequence) to the user for confirmation or non-confirmation (block 118). If the user confirms the proposed interpretation of the phrase (block 120), the system will initiate implementation of the phrase (block 122). If the phrase is a question, implementation may involve accessing information needed to answer the question. If the phrase is a command, implementation may involve generating signals (or alerting a computing system or other element to generate signals) to systems needed to execute the command. If the proposed interpretation of the phrase communicated by the system in block 118 is in the form of a question, and the user does not respond (in block 120) to the system communication with a confirmation (i.e., a "yes") or a non-confirmation (i.e., a "no") within a predetermined time period, the system may proceed (in block 124) to the selection module 44s (described below with respect to FIG. 8). If the proposed interpretation of the phrase communicated by the system is in the form of a command, and the user does not respond to the system communication with a confirmation or a non-confirmation within a predetermined time period, the interpretation of the phase is deemed to be correct, and the system may proceed to block 122 as previously described for implementation of the phrase.

For example, for the phrase shown in FIG. 5, if the system communicates the interpretation "Please call Bob Williams" to the user, the user may confirm (in block 120) that the interpretation as accurate. Control will then proceed to block 122 for implementation of the phrase to be initiated. However, if the term "call" is interpreted by the system as the word "cool" for example, the phrase communicated to the user will be inaccurate, and the user may not confirm the interpretation of the phrase. If the interpretation of the phrase is not confirmed by the user to be accurate in block 120, control may pass to the selection module 44s.

Figure 8:
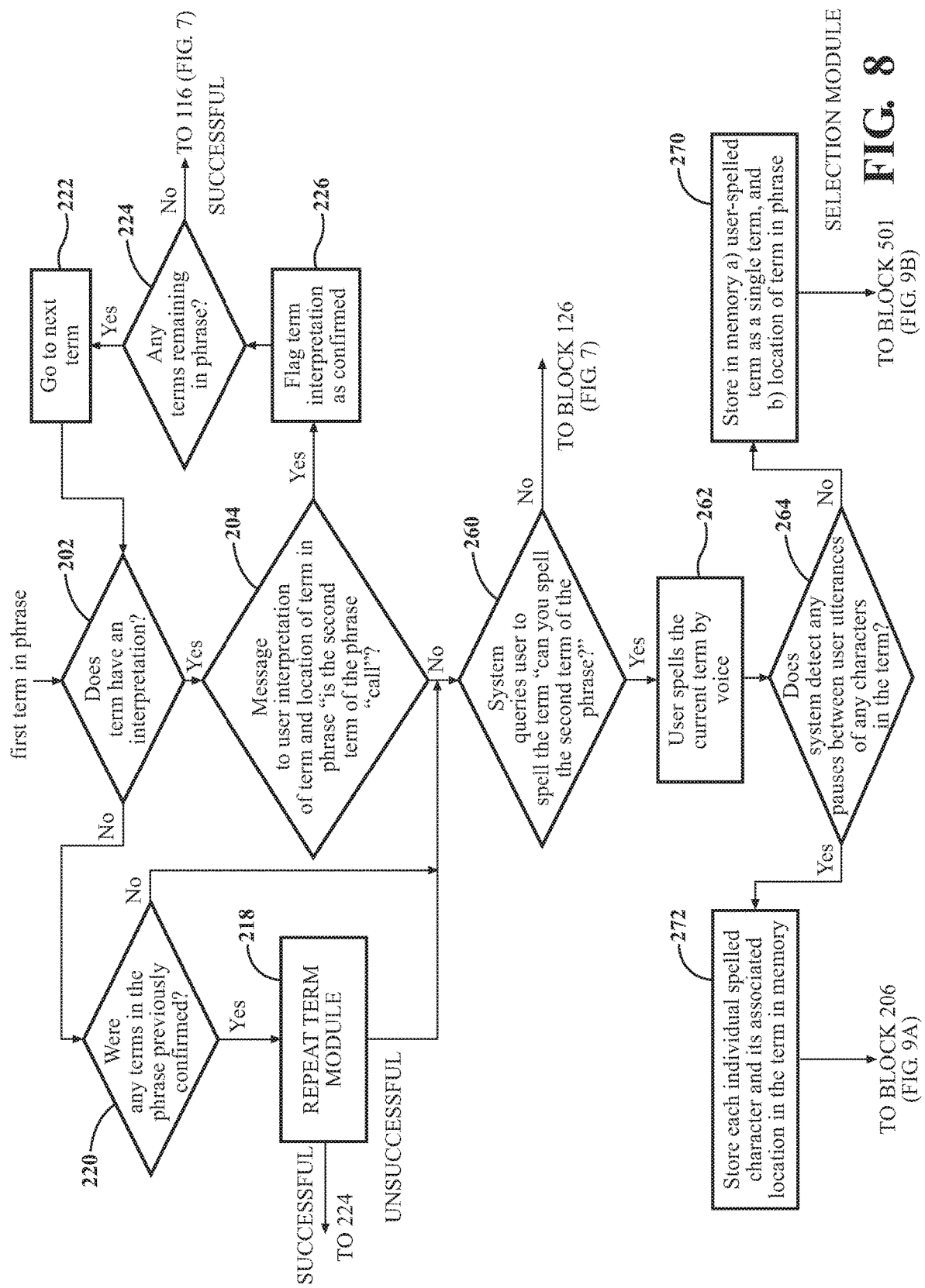
FIG. 8 is a flow diagram showing operation of an embodiment of a selection module of an interactive speech recognition system in accordance with an embodiment described herein.

Referring to FIG. 8, in one example of operation of the selection module 44s, the selection module first determines (in block 202), starting with the first term in the phrase, if an interpretation of the term was reached in the phrase interpretation module 44a. If an interpretation of the term was reached in the phrase interpretation module 44a, it will have been stored in memory. If an interpretation of the term was reached, the system messages or communicates (in block 204) to the user (for confirmation/non-confirmation) the interpretation reached in the phrase interpretation module 44a. For example, for the phrase shown in FIG. 5, the system may query the user via a user interface "Is the second term of the phrase 'call'?" If the user confirms that the interpretation of the term is accurate, the system flags or confirms the interpretation of the term as accurate (block 226) and proceeds (in blocks 224, 222) to evaluate any remaining terms in the phrase in the manner just described. If there are no terms remaining in the phrase (block 224), the interpretations of all of the terms in the phrase should have been confirmed by the user as accurate. The system then proceeds to block 116 of FIG. 7, where the system ensures that all terms have interpretations and communicates to the user (in block 118) an interpreted phrase formed from the interpreted terms presented in order. The system may then proceed as described previously with regard to FIG. 7.

Returning to block 204, if the user does not confirm that the interpretation of the term is accurate, control may proceed to block 260, where the system may query the user to spell the current term by voice. If the user cannot (or chooses not to) spell the current term, control may proceed to block 126 of FIG. 7 (error message). If the user proceeds to spell the current term (block 262), the system may detect (in block 264) whether or not there are any pauses between user utterances of any individual characters in the term. The system may be configured to determine that such a pause has occurred using any suitable criteria. In one example, the system may determine that a pause has occurred if a gap of more than one second occurs between utterance of the first and second characters of the term. Longer or shorter time periods may also be used as a criterion. If no pauses are detected between utterances of the individual characters, control may proceed block 270, where the entire term will be stored as a single block of text in memory (i.e., as a "term"), along with the location of the term in the phrase. Control may then proceed to block 501 (FIG. 9B) where the system will attempt to interpret the current term using the batch interpretation module 44e. However, if pauses are detected between utterances of the individual characters, each individual character may be stored separately in memory (block 272), along with its associated location in the term. Control may proceed to block 206, where the system will attempt to interpret the current term character by character using the character interpretation module 44f.

Other criteria for choosing between the character interpretation module and the batch interpretation module may also be used. In one or more arrangements, the selection criteria may be determined by the user using a user interface enabling the user to select options from a menu.

Referring back to block 202 of FIG. 8, if an interpretation of the term was not reached in the phrase interpretation module 44a, the system may (in block 220) determine if there are any terms in the phrase that were previously confirmed by the user as accurate. If there are previous accurate terms, the system may (in block 218) implement the repeat term module 44m (FIG. 10) with respect to the current term (i.e., the term currently being evaluated).

Referring to FIG. 10, the repeat term module 44m may (in block 302) compare the current term to terms which were previously accurately interpreted. If the current term is estimated to be the same as a term which was previously accurately interpreted (block 304), the system may (in block 306) infer that the current term is the same as the term which was previously accurately interpreted. One or more known inference algorithms may be adapted for the purposes described herein and stored in memory 44 for access by processor(s). The system may then (in block 308) generate a signal or message directed to communicating to a user (for confirmation/non-confirmation) the interpretation of the current term. The system may then receive a response from the user in reply to the signal, the response indicating either that the interpretation of the current term is correct or incorrect.

If the response indicates that the interpretation of the current term is correct, the system may (in block 310) flag the interpretation of the current term as confirmed. From this point on, the term is considered to be accurately interpreted. Control may then proceed to block 224 (FIG. 8) to evaluate any remaining terms in the phrase in the manner previously described. If the response indicates that the interpretation of the current term is incorrect, the attempt to match the current term with a previously interpreted term in the repeat term module is deemed to be unsuccessful. Then attempts by the system to interpret the term using the repeat term module 44m have failed and control may proceed to block 260 (previously described, FIG. 8) where the system may query the user to spell the current term.

Referring back to block 304 of FIG. 10, if the current term is not estimated to be the same as a term which was previously accurately interpreted, the attempt to match the current term with a previously interpreted term in the repeat term module is deemed to be unsuccessful. Control may then transfer to block 260 (previously described, FIG. 8) where the system may query the use to spell the current term.

For example, in the phrase shown in FIG. 5, the repeat term module 44m may examine previously processed terms to determine if a current term "call" is the same as the term "Please" which may have been previously accurately interpreted. If the terms are estimated to be the same, the system may infer that the terms are the same and interpret the term "call" accordingly. The system may then communicate to a user the interpretation of the term. The system may then receive a response from the user in reply to the signals, the response indicating either that the interpretation of the current term is correct or incorrect. If the system interprets "call" as being the same as "Please", the system is in error, and the user will indicate that the proposed interpretation is incorrect. If the current term is not estimated to be the same as a term which was previously accurately interpreted, the attempt to match the current term with a previously interpreted term in the repeat term module 44m is deemed to be unsuccessful. In either case, control may then transfer to block 260.

Figure 9A:
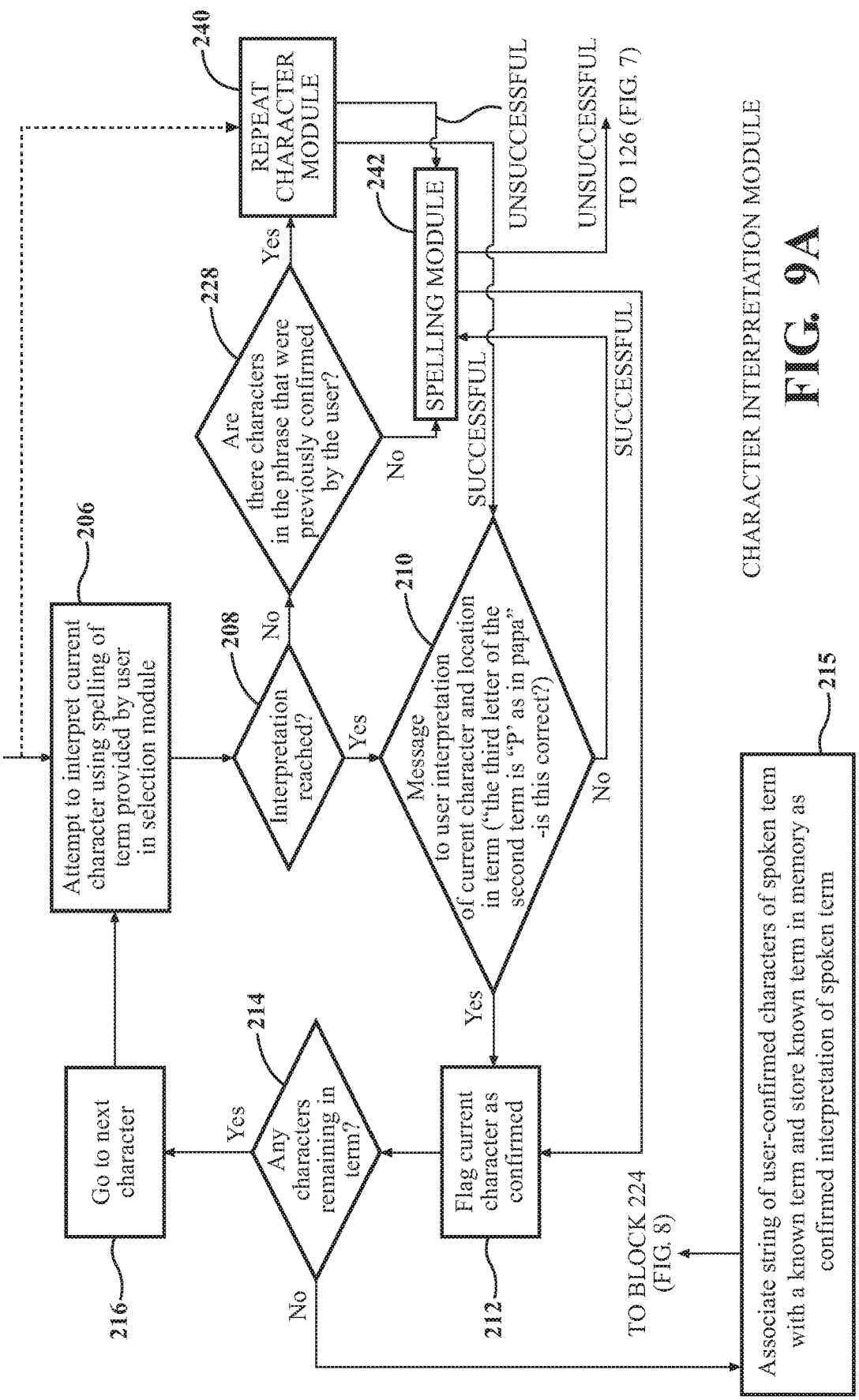
FIG. 9A is a flow diagram showing operation of an embodiment of a character interpretation module of an interactive speech recognition system in accordance with an embodiment described herein.

The term interpretation module 44d (described with respect to FIGS. 9A-9B and 11) attempts to accurately interpret each individual term of the spoken phrase not accurately interpreted by the phrase interpretation module by using the spoken spelling of the term provided by a user in the selection module 44s. The term interpretation module 44d may include or be configured to call on the character interpretation module 44f (FIG. 9A) and/or the batch interpretation module 44e (FIG. 9B). If operations in the term interpretation module 44d are successful, every term in the phrase will have been accurately interpreted (i.e., the accuracy of the interpretation of each term will have been confirmed by a user). These terms may then be conveyed to the user as a complete phrase by the phrase interpretation module 44a (block 118, FIG. 7), as previously described. If operations in the term interpretation module 44d are unsuccessful, an error message may be conveyed to the user, indicating that the system was unable to accurately interpret the spoken phrase (block 126, FIG. 7).

Referring now to FIG. 9A, the character interpretation module 44f may (in block 206) attempt to interpret a current character of a term using the spoken spelling of the term provided by user in the selection module 44s (FIG. 8). If an interpretation of the current character is reached (block 208), the system may (in block 210) generate one or more signals directed to messaging or communicating to a user (for confirmation/non-confirmation) the interpretation of the current character. If the user indicates that the interpretation of the current character is correct, the system (in block 212) may flag or confirm the interpretation of the current character as accurate. From this point on, the character is considered to be accurately interpreted. The system may then determine (block 214) if there are any remaining characters to be interpreted in the term. If there are characters remaining in the term, the system may go (block 216) to the next character in the term and attempt to interpret the character as just described. If there are no remaining characters to be interpreted in the term, the system may (in block 215) associate the string of user-confirmed characters of the spoken term with a known or recognized term (by comparison with a database, for example) and store the known or recognized term in memory as the confirmed interpretation of the spoken spelled term provided by the user during operation of the selection module 44s. Control may then transfer to block 224 of FIG. 8, for evaluation of any terms remaining in the spoken phrase.

Returning to block 210 of FIG. 9A, if the response in block 210 indicates that the interpretation of the current character is incorrect, control may proceed (in block 242) to the interactive spelling module 44g (FIGS. 12A, 12B), which will attempt to identify the character with the assistance of the user. If the interactive spelling module 44g is unsuccessful in identifying the character, control may proceed to block 126 of FIG. 7 (error message).

Returning to block 208 of FIG. 9A, if an interpretation of the character is not reached, the system may (in block 228) determine if there are characters in the phrase that were previously confirmed as accurate by the user. If there are previous accurate characters, the system may (in block 240) implement the repeat character module 44n (FIG. 11), in a further attempt to interpret the character independent of the user.

Figure 11:
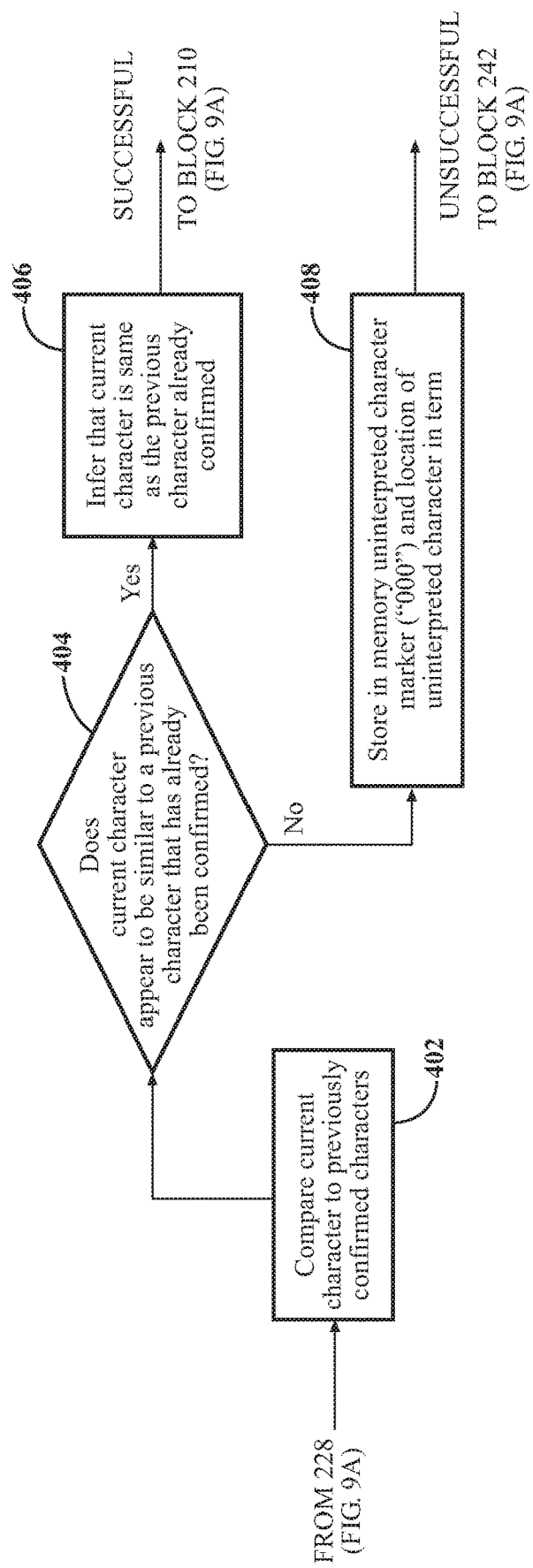
FIG. 11 is a flow diagram showing operation of an embodiment of a repeat character module of an interactive speech recognition system in accordance with an embodiment described herein.

The repeat character module 44n attempts to identify a character by comparing the character to other characters in the spoken phrase which were previously accurately interpreted. Referring to FIG. 11, the repeat character module 44n may (in blocks 402, 404) compare the current character to previously confirmed characters, and estimate if the current character is the same as a character which was previously accurately interpreted. If the current character is estimated to be the same as a character which was previously accurately interpreted, the system may (in block 406) infer that the current character is the same as the character which was previously accurately interpreted. The system may then go back to block 210 (FIG. 9A), to message to the user the proposed interpretation of the character for confirmation or non-confirmation, as previously described. If the current character is not estimated to be the same as a character which was previously accurately interpreted, an "uninterpreted character" marker is stored in memory (block 408), along with an associated location of the uninterpreted character in the term. The attempt to interpret the character using the repeat character module is then deemed to have failed, and control may transfer to block 242 of FIG. 9A, which implements the interactive spelling module 44g to attempt to identify the character with the assistance of the user.

For example, in the phrase shown in FIG. 5, if the interpretation of the first occurrence of the letter "l" in the term "call" is flagged as accurate, the repeat character module may estimate that the second letter "l" is the same character as the first "l". The system may then infer that the second "l" is the same character as the first "l", and interpret the second "l" accordingly.

In a particular arrangement (shown as a dashed line leading from block 206 to block 240, FIG. 9A), the system may be configured to enable a user to optionally directly enter the repeat character module 44n from just prior to execution of block 206 without the system first attempting to interpret the character. The system may be configured to enable a user to optionally directly enter the repeat character module 44n by, for example, uttering words such as "repeat", "same", or a distinctive trigger word allocated for indicating that the repeat character module 44n is to process the character. This trigger word may be spoken to the system at the end of the spelling of the term by the user in block 262, for example.

Referring again to FIG. 9A, in a particular arrangement (shown as a dashed line leading from block 206 to block 240, FIG. 9A), the system may be configured to enable a user to optionally directly enter the repeat character module 44n from just prior to execution of block 206 without the system first attempting to interpret the character. The system may be configured to enable a user to optionally directly enter the repeat character module 44n by, for example, uttering words such as "repeat", "same", or a distinctive trigger word allocated for indicating that the repeat character module 44n is to process the character. This trigger word may be spoken to the system at the end of the spelling of the term by the user in block 262, for example.

In yet another arrangement, the steps in blocks 228 and 240 may be performed prior to block 206. That is, the system may determine (in block 228, prior to block 206) if there are previously confirmed characters. If there are previously confirmed characters, control may transfer to block 240 (also prior to block 206). If interpretation fails in block 240, control may proceed to block 206. If interpretation is successful in block 240, control may transfer to block 210, as previously described. If an interpretation has not been reached by block 208, control may transfer directly from block 208 to the interactive spelling module (block 242) as previously described.

Referring to FIG. 9B, as an alternative to using the character interpretation module 44f a term, the batch interpretation module 44e may be used. The term interpretation module 44d may incorporate (or have access to) both the character interpretation module 44f and the batch interpretation module 44e. Either of these modules may be used for term interpretation, depending on various factors (for example, the presence or absence of pauses between characters, as described herein).

As previously described, the system may be configured to enable the user to enter the batch interpretation module 44e by omitting pauses between utterances of the individual characters of the spoken term spelled by the user in the selection module. Then, in block 501, the batch interpretation module 44e may attempt to interpret a spoken term using the spelling of the term provided by the user in selection module 44s. To interpret the spoken term using the spelling, the batch interpretation module 44e may interface with the common speech recognition database 48a as previously described, to attempt to find known terms having the same phonemes in the same relationship as the spoken spelled term. If an interpretation of the term was reached (block 503), the system may (in block 505) communicate to a user the interpretation of the term for confirmation or non-confirmation. The system may then (block 507) receive a response from the user in reply to communication of the interpretation of the term. The response may indicate either that the interpretation of the term is correct or incorrect. If the response indicates that the interpretation of the term is correct, the system may (block 509) confirm the interpretation of the term as accurate. Control may then proceed to block 224 of FIG. 8 for processing of any remaining terms in the phrase.

Referring back to FIG. 9B, block 507, if an interpretation of the term is not reached, control may transfer to the interactive spelling module 44g for spelling of the term. Normally, the term would first be processed by the assisted spelling module 44h. However, since the system may not be able to distinguish between individual characters forming a term being processed in the batch interpretation module 44e, the assisted spelling module 44h may have difficulty proposing characters for selection by the user. Thus, if the batch interpretation module 44e fails to reach an interpretation for the spoken spelling of the term provided in the selection module 44s, control may transfer from the batch interpretation module 44e directly to the user spelling module 44j, where the user will be prompted to select each individual letter of the unidentified term, in order to spell the term. If control is to transfer from the batch interpretation module 44e directly to the user spelling module, a flag BIM may be set (for example, to BIM=1) (block 511) prior to the control transfer. This flag may indicate direct transfer of processing of a term from the batch interpretation module 44e to the user spelling module 44j (in block 513), and that processing of this term by the user spelling module 44j is to be performed in a continuous loop until all the characters in the term have been spelled by the user.

Figure 12A:
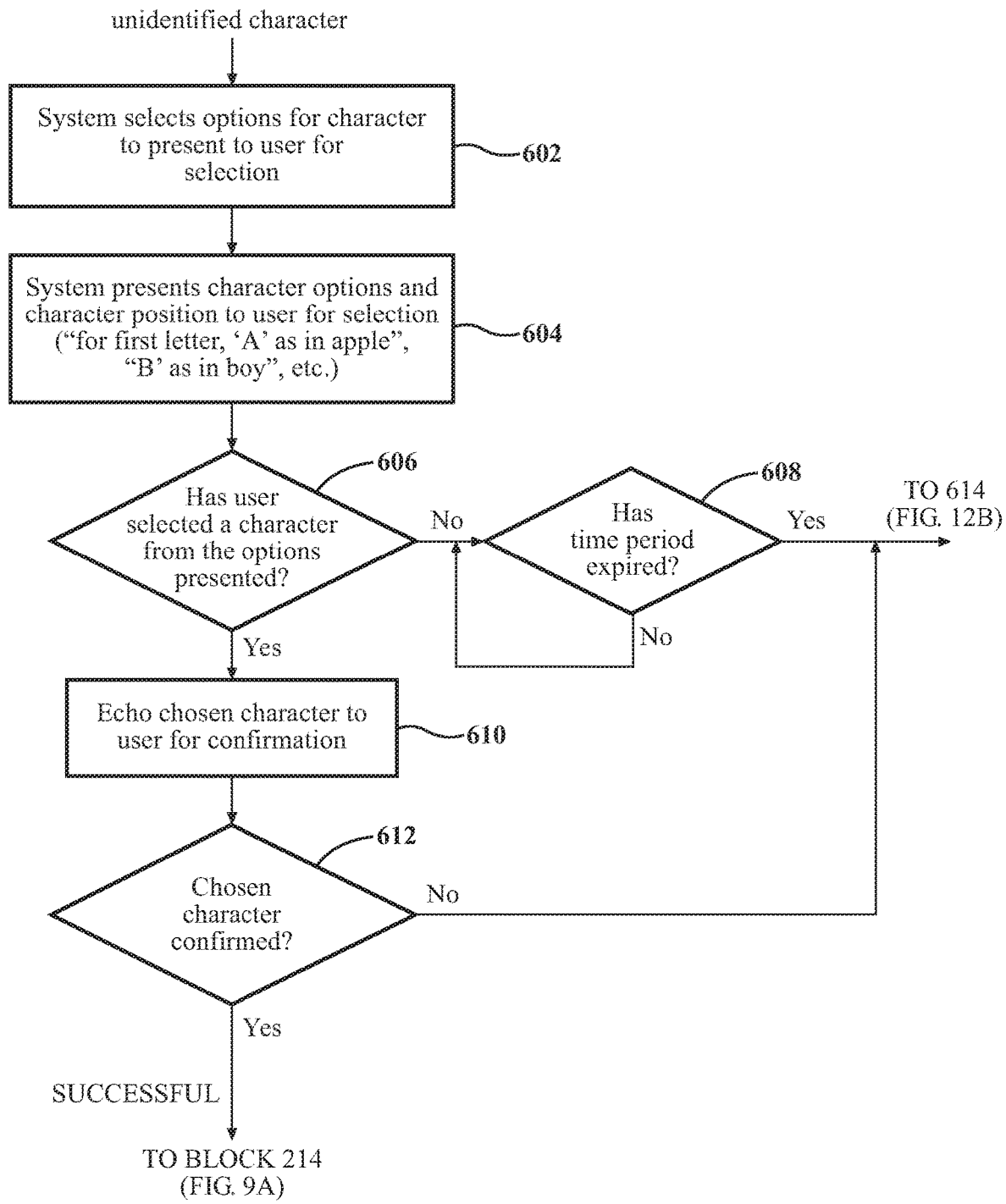
FIG. 12A is a flow diagram showing operation of an embodiment of an assisted spelling module of an interactive speech recognition system in accordance with an embodiment described herein.
Figure 12B:
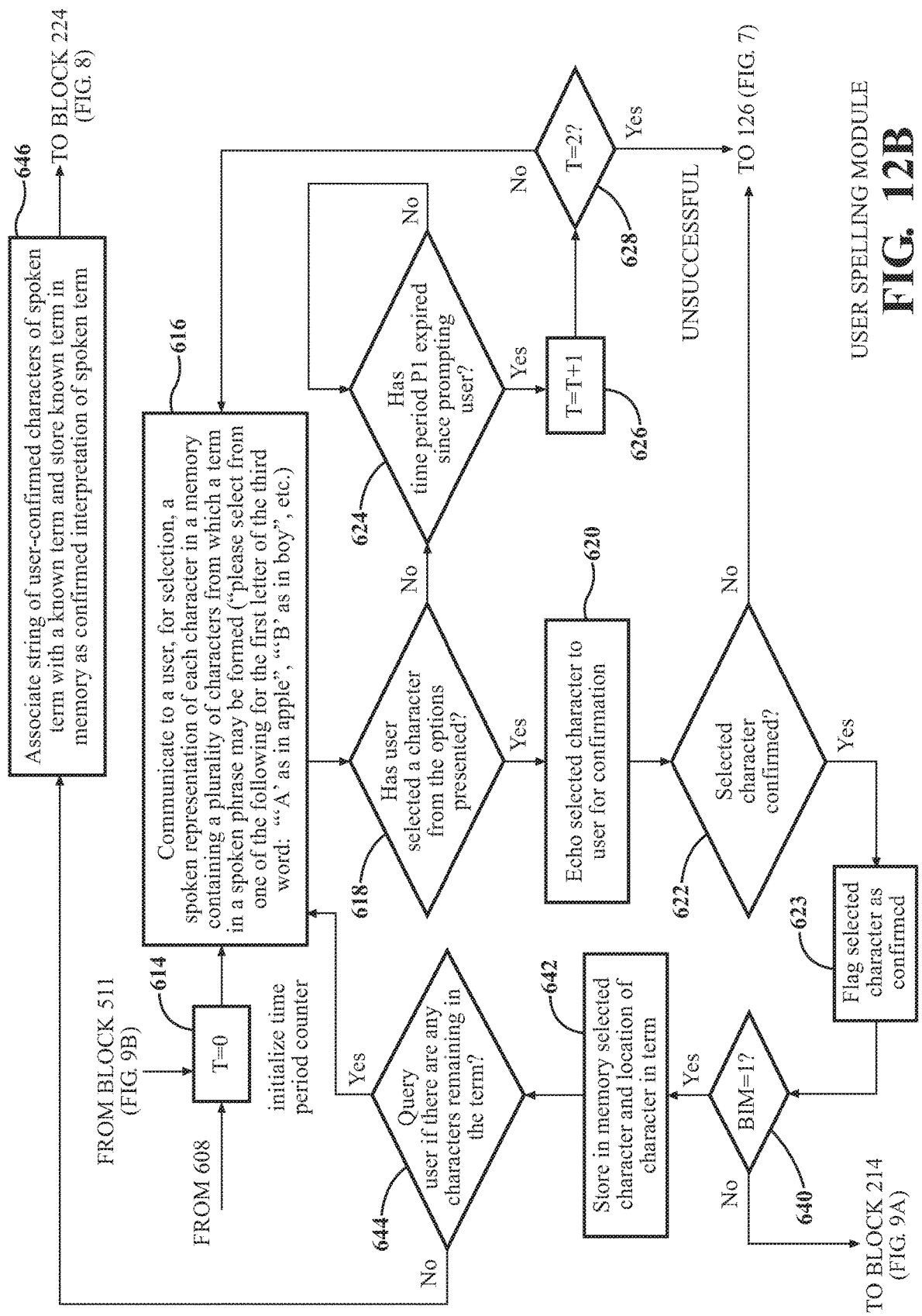
FIG. 12B is a flow diagram showing operation of an embodiment of a user spelling module of an interactive speech recognition system in accordance with an embodiment described herein.

Referring now to FIGS. 12A and 12B, the interactive spelling module 44g is configured to achieve an accurate identification or spelling of one or more single characters. The interactive spelling module 44g may include an assisted spelling module 44h and a user spelling module 44j. The system may implement the assisted spelling module 44h first in an attempt to identify a character. If spelling of the character is unsuccessful using the assisted spelling module 44h, the system may implement the user spelling module 44j, as described herein.

Referring to FIG. 12A, the assisted spelling module is configured to (in blocks 602, 604) select a plurality of "best guess" options for interpretation of a character, and to present those options for user selection. For example, in the phrase shown in FIG. 5, the system may, based on reference to local databases 48, propose the characters "'c' is for car" and "'k' is for kangaroo" as possible interpretations of the first character of the term "call". The user may select one of these terms or not.

The assisted spelling module may initially select character-keyword combinations which may be found in a standard database (for example, in the well-known international radiotelephony spelling alphabet). With repeated use by the user, the speech recognition system may adapt to specific character-keyword combinations personal to the user. This adaptation may be implemented through monitoring of the user's personal spelling and word-selection preferences and characteristics, using an AI/machine learning capability 44r stored in memory 44 and configured for implementation by processor(s) 46. For example, a particular user may prefer the character-keyword combination "B as in boy" rather than "B as in Bravo". The assisted spelling module may be adapted by the AI/machine learning capability 44r to suggest this character-keyword combination for the character "B".

If the user (in block 606) selects one of the options presented, the system may (in block 610) communicate or "echo" the user-chosen character to the user for confirmation or non-confirmation. If the user confirms the character communicated by the system (block 612), the system may confirm the character as accurately identified. As the interactive spelling module 44g has now successfully identified the character, control may transfer to back to block 214 of the character interpretation module 44f (FIG. 9A).

Returning to block 606 and to block 608 of FIG. 12A, if the user fails to select one of the options presented within a specified time period (or if the user does not confirm one of the character interpretations presented by the system in block 604), the system may transfer control to the user-spelling module 44j (FIG. 12B). Referring to FIG. 12B, the user-spelling module 44j may (in block 614) initialize a time period counter T. The time period counter T counts a number of time periods P1 which have expired since prompting the user to specify a character as shown in block 616. This counter is used in the user spelling module 44j.

In block 616, the system may communicate to a user a spoken representation of each character in a memory containing a plurality of characters from which a term in a spoken phrase may be formed. The user is prompted to select a character based on its association with a keyword which is stored in memory and which is phonetically recognizable by the system. As previously described, each character is associated with a single, distinctive keyword configured to facilitate recognition of the character by the system. The user selects the character by speaking the character and the keyword in the format "'A' is for apple" or "'B' is for boy', etc., so that the keyword is recited in association with the selected character.

In one or more arrangements, the system may communicate all of the available character/keyword combinations in alphabetical order. The recitation of character/keyword combinations is configured to be interruptible by the user's reply, so that the system may receive the user's response (in block 618) at any time. The response may be stored in a buffer, if needed, for comparison with the keywords stored in the memory.

When the system has selected a proposed character based on association with the keyword it interprets as being spoken by the user, the system may (in block 620) communicate (or "echo") the selected character to the user for confirmation or non-confirmation. If the user confirms (in block 622) that the character communicated is accurate, the system may (in block 623) flag the character interpretation as being "confirmed" (i.e., the current character under evaluation will be interpreted to be the same as the user-selected character). The system may then (in block 640) check to see if the batch interpretation module flag BIM is set. If the flag is not set, the call to the interactive spelling module did not originate from the batch interpretation module, and control may transfer to block 214 (FIG. 9A). If the flag BIM is set, the process of interpreting the term continues to loop through the user spelling module 44j until the entire term is spelled. Thus, the character selected by the user in block 618 (and its location) are stored in memory in block 642. The system may then (in block 644) query the user as to whether there are any characters remaining in the term. If there are characters remaining in the term, control may proceed to block 616 for processing of the remaining characters as just described. If there are no characters remaining in the term, control may proceed to block 646 where the string of characters just confirmed by the user as accurate may be associated with a known or recognized term, as a confirmed interpretation of the spoken term. This may be done by comparison with a database as previously described. Control may then proceed to block 224 (FIG. 8).

Returning to block 618 of FIG. 12B, if the user does not speak a selected character and associated keyword with a predetermined time period P1 (block 624) after the system finishes reciting the available character/keyword combinations, the system may (in block 626) increment the timer counter T, indicating that a first time period P1 has passed since the prompt in block 616 was issued. The system may then repeat the prompt in block 616. If another time period P1 (in block 628) passes without the user selecting a character/keyword combination, it may be assumed that the user does not intend to select a character/keyword combination. The system may then proceed to block 126 of FIG. 7 (error message) as previously described.

To summarize, the embodiments of the speech recognition system described herein enable erroneous system interpretations of spoken phrases, terms, and characters to be corrected, by enabling spelling and user confirmation of the elements of a spoken phrase.

Figure 13:
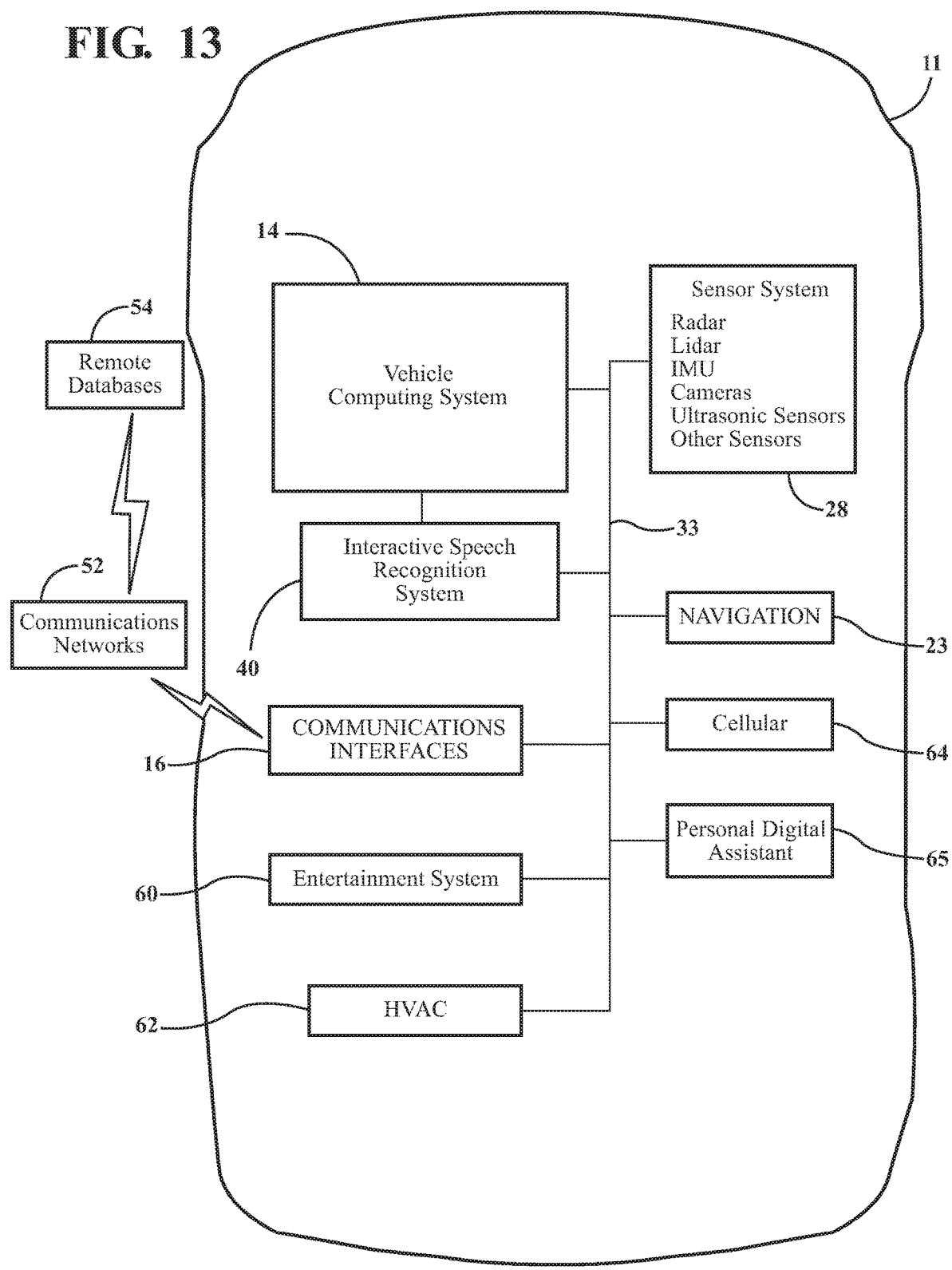
FIG. 13 is a block schematic diagram showing an embodiment of an interactive speech recognition system as described herein incorporated into a vehicle and configured for interpreting speech directed to controlling aspects of vehicle operation.

FIG. 13 shows a particular application of an embodiment of the interactive speech recognition system 40 described herein. In the embodiment shown, the interactive speech recognition system 40 may be incorporated into a vehicle 11 and may be configured to communicate with various vehicle systems, to enable at least partial control of these systems by voice command. The speech recognition system 40 may be configured to communicate voice commands to the vehicle navigation system 23, a vehicle entertainment system 60, the vehicle HVAC system 62, a vehicle occupant wireless or cellular device 64 which may be mounted in a cradle in electronic communication with the speech recognition system, a personal digital assistant 65, and any other device or system which may be controllable by speech command. The various systems in communication with the speech recognition system 40 may be separate from the interactive speech recognition system 40, or the systems may be logically or physically integrated with the speech recognition system 40. The vehicle 11 may also include conventional vehicle sensor systems 28 and communication networks 52, and remote databases 54 as previously described.

Accurately interpreted speech commands may be communicated to the various systems shown via a vehicle computing system 14 in communication with the speech recognition system. The computing system 14 may be configured to control the vehicle systems, or the speech commands may be transmitted directly to the vehicle systems if the vehicle systems are configured to be operable by signals received directly from the speech recognition system. Communication between elements of the vehicle 11 may be conducted via a suitable bus 33. In one or more particular arrangements, the speech recognition system processor(s) 46 and other elements of the speech recognition system may be in communication with the vehicle communication interfaces 16, and the speech recognition system 40 may communicate with remote databases and other entities via the vehicle communication interfaces 16.

While, for purposes of simplicity of explanation, the one or more methodologies shown herein, e.g., in the form of flow diagrams, are shown and described as a series of acts, it is to be understood and appreciated that the subject disclosure is not limited by the order of acts, as some acts can, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosure.

As will be appreciated by one skilled in the pertinent art upon reading the preceding disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An interactive speech recognition system for interactively interpreting a spoken phrase, the system comprising:
   one or more processors, and at least one memory in communication with the one or more processors, the at least one memory being configured for storing information and program instructions usable by the one or more processors, wherein the at least one memory stores:
   a phrase interpretation module including instructions that, when executed by the one or more processors, cause the one or more processors to:
   a) attempt to interpret an individual term of the spoken phrase;
   b) if an interpretation of the term was reached, store in the at least one memory the interpretation of the term and a location of the term in the spoken phrase;
   c) if an interpretation of the term was not reached, store in the at least one memory an indication that the term is uninterpreted and a location of the uninterpreted term in the spoken phrase; and
   repeat steps (a)-(c) for each individual term in the spoken phrase;
   a repeat term module including instructions that, when executed by the one or more processors, cause the one or more processors to, if an interpretation of a term was not reached in the phrase interpretation module, estimate if the term is the same as a term which was previously accurately interpreted;
   a character interpretation module including instructions that, when executed by the one or more processors, cause the one or more processors to, if the term is not estimated in the repeat term module to be the same as a term which was previously accurately interpreted, attempt to interpret a character of the term from a spoken spelling of the term provided by the user;

a repeat character module including instructions that, when executed by the one or more processors, if an interpretation of the character of the term was not reached in the character interpretation module and using the spoken spelling of the term provided by the user, cause the one or more processors to estimate if the character of the term is the same as a character which was previously accurately interpreted; and an interactive spelling module including instructions that, when executed by the one or more processors, cause the one or more processors to attempt to, if the character of the term is not estimated in the repeat character module to be the same as a character which was previously accurately interpreted, identify the character of the term by enabling a user to interactively select the character of the term from a plurality of characters.

2. The interactive speech recognition system of claim 1, wherein the phrase interpretation module further includes instructions that, when executed by the one or more processors, cause the one or more processors to:

if an interpretation was reached for each term of the spoken phrase, communicate to a user an interpreted spoken phrase formed by the interpretations of the terms as communicated in sequence according to the locations of the terms in the interpreted spoken phrase;

receive a response from the user in reply to communication of the interpreted spoken phrase, the response indicating either that the interpreted spoken phrase is correct or incorrect; and if the response indicates that the interpreted spoken phrase is correct, initiate implementation of the spoken phrase.

3. The interactive speech recognition system of claim 1, wherein the repeat character module includes instructions that, when executed by the one or more processors, cause the one or more processors to, if the character of the term is estimated to be the same as a character which was previously accurately interpreted, interpret the character of the term to be the same as the character which was previously accurately interpreted.

4. The interactive speech recognition system of claim 1, wherein the repeat term module includes instructions that, when executed by the one or more processors, cause the one or more processors to:

if the term is estimated to be the same as a term which was previously accurately interpreted, interpret the term to be the same as the term which was previously accurately interpreted;

if the term is interpreted to be the same as a term which was previously accurately interpreted, communicate to a user the interpretation of the term;

receive a response from the user in reply to communication of the interpretation of the term, the response indicating either that the interpretation of the term is correct or incorrect; and if the response indicates that the interpretation of the current term is correct, confirm the interpretation of the term.

5. The interactive speech recognition system of claim 1, wherein the character interpretation module includes instructions that, when executed by the one or more processors, cause the one or more processors to:

if an interpretation of the character of the term was reached in the character interpretation module, communicate to the user the interpretation of the character of the term;

receive a response from the user in reply to communication of the interpretation of the character of the term, the response indicating either that the interpretation of the character of the term is correct or incorrect; and if the response indicates that the interpretation of the character of the term is correct, confirm the interpretation of the character of the term.

6. The interactive speech recognition system of claim 1, wherein the at least one memory stores a batch interpretation module including instructions that, when executed by the one or more processors, cause the one or more processors to:

attempt to interpret the term using the spoken spelling of the term provided by the user;

if an interpretation of the term was reached, communicate to the user the interpretation of the term;

receive a response from the user in reply to communication of the interpretation of the term, the response indicating either that the interpretation of the term is correct or incorrect; and if the response indicates that the interpretation of the term is correct, confirm the interpretation of the term.

7. The interactive speech recognition system of claim 1 wherein the at least one memory stores an assisted spelling module including instructions that when executed by the one or more processors cause the one or more processors to:

a) determine a plurality of proposed interpretations of the character of the term;

b) communicate to a user the plurality of proposed interpretations of the character of the term; and c) receive a selection by the user of one of the proposed interpretations of the plurality of proposed interpretations;

d) echo to the user the user's selection of the one of the proposed interpretations of the plurality of proposed interpretations;

e) receive a response from the user in reply to echoing to the user the user's selection of the one of the proposed interpretations of the plurality of proposed interpretations, the response indicating either that the echoed selection is correct or incorrect; and f) if the response indicates that the echoed selection is correct, confirm the interpretation of the character of the term.

8. The interactive speech recognition system of claim 1 wherein the at least one memory stores a user spelling module including instructions that when executed by the one or more processors cause the one or more processors to:

a) communicate to a user a spoken representation of each character in a memory containing a plurality of characters from which a term in a spoken phrase may be formed, the memory also containing a spoken representation associated with each character of the plurality of characters;

b) receive, from the user, a user-spoken representation associated with a character of the plurality of characters selected by the user;

c) echo to the user the user-spoken representation associated with the character of the plurality of characters selected by the user;

d) receive a response from the user in reply to echoing to the user the user-spoken representation associated with the character of the plurality of characters selected by the user, the response indicating either that the echoed user-spoken representation is correct or incorrect; and e) if the response indicates that the echoed user-spoken representation is correct, confirm the interpretation of the character.

9. A method of interactively interpreting a spoken phrase, the method comprising steps of:

attempting, by a phrase interpretation module of an interactive speech recognition system, to accurately interpret the spoken phrase by interpreting each individual term of the spoken phrase by:

a) attempting to interpret an individual term of the spoken phrase;

b) if an interpretation of the term was reached, storing in a memory the interpretation of the term and a location of the term in the spoken phrase;

c) if an interpretation of the term was not reached, storing in the memory an indication that the term is uninterpreted and a location of the uninterpreted term in the spoken phrase;

repeating steps (a)-(c) for each individual term in the spoken phrase;

attempting to, by a repeat term module of the interactive speech recognition system, if an interpretation of a term was not reached in the phrase interpretation module, estimate if the term is the same as a term which was previously accurately interpreted;

attempting to, by a character interpretation module of the interactive speech recognition system and if the term is not estimated in the repeat term module to be the same as a term which was previously accurately interpreted, interpret a character of the term from a spoken spelling of the term provided by the user;

estimating, by a repeat character module of the interactive speech recognition system, if an interpretation of the character of the term was not reached in the character interpretation module and using the spoken spelling of the term provided by the user, if the character of the term is the same as a character which was previously accurately interpreted; and attempting to, by an interactive spelling module of the interactive speech recognition system, and if the character of the term is not estimated in the repeat character module to be the same as a character which was previously accurately interpreted, identify the character of the term, by enabling a user to interactively select the character of the term from a plurality of characters.

10. The method of claim 9, further comprising steps of, by the phrase interpretation module of the interactive speech recognition system:

if an interpretation was reached for each term of the spoken phrase, communicating to a user an interpreted spoken phrase formed by the interpretations of the terms as communicated in sequence according to the locations of the terms in the interpreted spoken phrase;

receiving a response from the user in reply to communication of the interpreted spoken phrase, the response indicating either that the interpreted spoken phrase is correct or incorrect; and if the response indicates that the interpreted spoken phrase is correct, initiating implementation of the spoken phrase.

11. The method of claim 9, further comprising steps of, by a repeat character module of the interactive speech recognition system, if the character of the term is estimated to be the same as a character which was previously accurately interpreted, interpreting the character of the term to be the same as the character which was previously accurately interpreted.

12. The method of claim 9, further comprising steps of, by a repeat term module of the interactive speech recognition system:

if the term is estimated to be the same as a term which was previously accurately interpreted, interpreting the term to be the same as the term which was previously accurately interpreted;

if the term is interpreted to be the same as a term which was previously accurately interpreted, communicating to a user the interpretation of the term;

receiving a response from the user in reply to the communication of the interpretation of the term, the response indicating either that the interpretation of the term is correct or incorrect; and if the response indicates that the interpretation of the term is correct, confirming the interpretation of the term.

13. The method of claim 9 further comprising steps of, by a character interpretation module of the interactive speech recognition system:

if an interpretation of the character of the term was reached, communicating to the user the interpretation of the character of the term;

receiving a response from the user in reply to communication of the interpretation of the character of the term, the response indicating either that the interpretation of the character of the term is correct or incorrect; and if the response indicates that the interpretation of the character of the term is correct, confirming the interpretation of the character of the term.

14. The method of claim 9, further comprising steps of, by a batch interpretation module of the interactive speech recognition system:

attempting to interpret the term using the spoken spelling of the term provided by the user;

if an interpretation of the term was reached, communicating to the user the interpretation of the term;

receiving a response from the user in reply to communication of the interpretation of the term, the response indicating either that the interpretation of the term is correct or incorrect; and if the response indicates that the interpretation of the term is correct, confirming the interpretation of the term.

15. The method of claim 9, further comprising steps of, by an assisted spelling module of the interactive speech recognition system:

a) determining a plurality of proposed interpretations of the character of the term;

b) communicating to a user the plurality of proposed interpretations of the character of the term; and c) receiving a selection by the user of one of the proposed interpretations of the plurality of proposed interpretations;

d) echoing to the user the user's selection of the one of the proposed interpretations of the plurality of proposed interpretations;

e) receiving a response from the user in reply to echoing to the user the user's selection of the one of the proposed interpretations of the plurality of proposed interpretations, the response indicating either that the echoed selection is correct or incorrect; and f) if the response indicates that the echoed selection is correct, confirming the interpretation of the character of the term.

16. The method of claim 9, further comprising steps of, by a user spelling module of the interactive speech recognition system:
- a) communicating to a user a spoken representation of each character in a memory containing a plurality of characters from which a term in a spoken phrase may be formed, the memory also containing a spoken representation associated with each character of the plurality of characters;
- b) receiving, from the user, a user-spoken representation associated with a character of the plurality of characters selected by the user;
- c) echoing to the user the user-spoken representation associated with the character of the plurality of characters selected by the user;
- d) receiving a response from the user in reply to echoing to the user the user-spoken representation associated with the character of the plurality of characters selected by the user, the response indicating either that the echoed user-spoken representation is correct or incorrect; and
- e) if the response indicates that the echoed user-spoken representation is correct, confirm the interpretation of the character.

* * * * *